(12) United States Patent
Makins

(10) Patent No.: US 11,769,219 B2
(45) Date of Patent: Sep. 26, 2023

(54) COMPUTER-IMPLEMENTED AND INTERACTIVE REAL ESTATE CONTRACT GENERATION AND EDITING PROCESS

(71) Applicant: Anthony Makins, Coconut Creek, FL (US)

(72) Inventor: Anthony Makins, Coconut Creek, FL (US)

( * ) Notice: Subject to any disclaimer, the term of this patent is extended or adjusted under 35 U.S.C. 154(b) by 0 days.

(21) Appl. No.: 17/526,150

(22) Filed: Nov. 15, 2021

(65) Prior Publication Data

US 2023/0153930 A1 May 18, 2023

(51) Int. Cl.
G06Q 50/16 (2012.01)
G06Q 50/18 (2012.01)

(52) U.S. Cl.
CPC ............ *G06Q 50/16* (2013.01); *G06Q 50/167* (2013.01); *G06Q 50/18* (2013.01)

(58) Field of Classification Search
None
See application file for complete search history.

(56) References Cited

U.S. PATENT DOCUMENTS

| | | |
|---|---|---|
| 6,067,531 A | 5/2000 | Hoyt et al. |
| 7,756,772 B1 | 7/2010 | Konopnicki et al. |
| 8,145,563 B2 | 3/2012 | Misraje et al. |
| 8,489,498 B1 | 7/2013 | Flaxman et al. |
| 8,566,112 B2 | 10/2013 | Klivington et al. |
| 10,552,525 B1 * | 2/2020 | Allison .................. G06Q 10/10 |
| 2002/0099592 A1 | 7/2002 | Donahue |
| 2005/0288955 A1 | 12/2005 | Lewiss-Hachmeister |
| 2007/0208641 A1 | 9/2007 | Smith et al. |
| 2007/0219817 A1 | 9/2007 | Wu |
| 2010/0023440 A1 | 1/2010 | Fraser et al. |
| 2013/0339189 A1 | 12/2013 | Minerick |
| 2014/0089139 A1 * | 3/2014 | Shotwell ............ G06Q 30/0623 705/26.35 |
| 2014/0100956 A1 | 4/2014 | Abileah et al. |
| 2014/0164255 A1 | 6/2014 | Daly et al. |
| 2015/0262292 A1 | 9/2015 | Corr et al. |
| 2017/0287090 A1 | 10/2017 | Hunn et al. |
| 2022/0084148 A1 * | 3/2022 | Ems ..................... G06F 40/151 |

FOREIGN PATENT DOCUMENTS

WO 2019018701 A1 1/2019

* cited by examiner

*Primary Examiner* — Jan P Mincarelli
(74) *Attorney, Agent, or Firm* — Mark C. Johnson; Johnson Dalal

(57) ABSTRACT

A computer-implemented and interactive real estate contract generation and editing process that allows a user to select "easy" or "do-it-yourself" contract formation sessions, comprising the steps of communicatively coupling a first electronic computing device to a computer server over a wireless communication network and generating a digital graphical user interface (GUI) on an electronic display of the first computing device with a plurality of digital data input fields operably configured to receive alpha-numeric text; initiating a network-based remote "easy" contract formation session that includes selecting a plurality of GUI icons and inputting contract formation data into each of the plurality of digital data input fields; and generating a digital document with a plurality of independent preformed paragraphs each having at least one fillable contract data field disposed therein and filled in with one of the plurality of digital data input fields to create a finalized digital document.

10 Claims, 88 Drawing Sheets

Sign Up

[ First Name ]    [ Last Name ]

[ Email Address ]

[ Phone Number ]

[ Password ]    [ Confirm Password ]

☐ Please check this box to confirm that you have read and agree to our Terms & Conditions

SIGN UP

FIG. 4

Verification by Email

To verify your profile enter your email address below:

Email Address

SUBMIT

Complete your profile

● Email Verified
○ Process Verified

Sign In

If you already have an account with us, please login below.

Email Address

Password

☐ Remember Me   Forgot Password?

SIGN IN

FIG. 8

Forgot your Password?

Enter your email address below:

Email Address

SUBMIT

Back

Contract

Buying a Home

Buyer Information

Are you buying this property through a business entity?

YES  NO

BACK  CONTINUE

Contract
Buying a Home

Do you know seller information?

YES    NO

BACK    CONTINUE

Contract
Buying a Home

Are you paying cash?

| CASH | LOAN | OTHER |

Upload Proof of funds doc PDF

BACK    CONTINUE

Contract
🏠 Buying a Home

Are you approved?

[ YES ]

By what bank? [ ]

For the amount? [ ]

[ BACK ]　　[ CONTINUE ]

FIG. 25

Contract

🏠 Buying a Home

How much are you putting as a down Payment?

FIG. 26

Contract

🏠 Buying a Home

Want the seller to put any money toward Closing Cost?

[ YES ]  [ NO ]

How much

[ ? ]

[ BACK ]  [ CONTINUE ]

Contract

🏠 Buying a Home

Do you know of any assessments, Liens or open permits on the property?

[ YES ]    [ NO ]

Explain

[ BACK ]    [ CONTINUE ]

FIG. 29

Contract

🏠 Buying a Home

How long will you give the seller to clear open permits or liens on property?

Notes

Days

Normally 15-30 Days

BACK

Contract

🏠 Buying a Home

Did you notice any fixtures in the property that will not be with the sale of the property?
(Ex. light fixtures, ceiling fans, TV mounts, shelving, unit, etc.)

[ YES ]   [ NO ]

First Name: Julia    Last Name: Anderson

First Name: Alex    Last Name: Rodriges    ×

+ Add

[ BACK ]    [ CONTINUE ]

FIG. 32

Contract
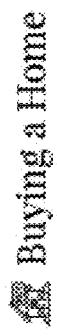 Buying a Home
Inspection:
How many Inspection Days you need?
(5-15 days)
BACK
CONTINUE
FIG. 33

Contract

Buying a Home

When do you want closing to be?

BACK

Contract
Buying a Home

Any Home warranty on the appliances?

YES | NO

Components

Appliances | Appliances | ×

+ Add

BACK | CONTINUE

FIG. 36

Contract

🏠 Buying a Home

Contingencies: This contract will have a financing / appraisal would you like any more contingencies Additional section Comments

BACK

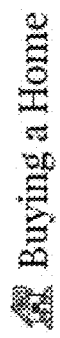
FIG. 38

FIG. 39

Contract
 Buying a Home

Are you complete?

YES

NO

BACK

SUBMIT

Contract

🏠 Buying a Home

Summary of the contract

Seller Information: Alex Smith
Tax ID Of The Property: 123456789
Legal Description: Lorem ipsum goes here Buyer (s) Alexander Robinson submitted an offer for property located on Loremipsum st. at Miami, FL, USA. (With/without) personal property included at a purchase price of $100,000.00 The buyer agrees to use Lorem ipsum Inc. Title company and will put down $1000.00 in escrow. The Buyer is/is not approved with Bank of America Bank.

Buyer chooses to use Julia Robinson as Title and Escrow agent in this transaction. Closing date shall be on or before 11.01.2020. Buyer elects that this contract shall be/not be contingent on the buyer selling a property. Buyer will have 10 days to inspect the property and can cancel the contract at any time before that. Appraisal will be ordered on Lorem ipsum. All liens and open permits shall be paid prior to closing. The seller has 10 days to accept this offer. Buyer/Seller has/has not chosen a Real Estate licensed agent to work with them in this transaction.

BACK    NEXT

FIG. 42

Contract

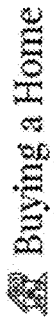 Buying a Home

Residential Sale and Purchase Agreement

A. The Parties in this Real Estate Sale and Purchased agreement made on effective date on the 8/30/2020 by both the "Seller"(s) Julia Anderson and the B. "Buyer"(s) Alexander Robinson a. In the State of Florida County of Where county the house is in agrees to sells, trade, rent or convey Real Property as describe in this agreement listed below.

C. Legal Description:
  a. The property Single Family described as: Legal description
  b. TAX Parcel Information from the counties property appraisal website D. Person Property:
  a. The seller will/will not included in this agreement the purchase of personal property. Any/All removable items from the real property must be move prior to closing. All fixtures, must remain in the property.

FIG. 43A

E. Fixtures:
   a. All parties agrees that all fixtures located on/ in property at the time of Executed Contract but not limited to Windows, blinds, heating systems, all or any HVAC components, appliances, A/C conditioners, electric fixtures, fans, Furniture or all fixtures to Real Property that is fixed "shall be included" in the sale of the property.

F. Purchase Price:
   a. The buyer agrees to purchase the property for (from auto Fill) in dollars.
   b. Buyer agrees to put down _____ towards the loan G. Title/ Escrow
   a. Buyer or Seller agrees to use _____ title company as escrow agent
   b. The buyer agrees to put From Autofill as an earnest money deposit/ or consideration under this agreement.

BACK    NEXT

FIG. 43B

Contract
Buying a Home

Residential Sale and Purchase Agreement

H. Financing:

a. Buyer must submit a loan application within 5 days of executed contract to the banking institution.

b. Buyer agrees to purchase the property is contingent upon the buyer's ability to obtain financing through a FHA/Conventional Loan.

c. In the event the buyer fails to obtain financing earnest money funds held as escrow funds for this transaction to purchase the property by the closing date maybe terminated at the option of the buyer. If the termination occurs at any time before the closing date Buyer shall be entitled to all the earnest money deposit.

I. Closing Date:

Buyer elects closing date on or before

J. Sale of another property a. Buyer elects that this property is/is not contingent on the buyer selling a property

FIG. 44A

K. Inspection period:
a. Inspection will be held [ ] days of this contract. Within this time buyer choose the right to cancel and terminate the contract for any reason. All earnest money deposit shall be return to buyer
b. The inspection company will be use is

L. Closing cost:
a. Buyer request that the seller gives buyer [ ] towards closing cost and pre paids. The cost attributed to the closing of the property. Seller has the option to give buyer some monies reducing the seller take home for buyers closing fees.

M. Property Condition:
a. Seller agrees to main the property in the current condition, other than ordinary wear, and tear from time of this agreement until closing. If the property is destroyed, damaged prior to closing this agreement may be terminated.

FIG. 44B

Contract
🏠 Buying a Home

Residential Sale and Purchase Agreement

N. Appraisal:

a. The appraisal of the property shall be contingent on the property. The appraisal of the property being equal to or greater than the agreed purchase price. If the purchase price does not apprise to at least the purchase price within 3 days business days in such event the parties cannot come to an agreement this contract shall be terminated and the earnest money shall be returned to the buyer.

b. The appraisal will be order on or before ▭

O. Termination:

a. In the event this agreement is terminated for the clauses in this agreement any and all money shall be returned to the buyer.

P. Dispute Resolution:

Buyer and Seller will have 15 calendar days after the date conflicting demands for the Deposit are made to attempt to resolve such dispute, failing which, Buyer and Seller shall submit such Dispute to mediation

FIG. 45A

Q. Business Days

This contract may be stated as business days or calendar days Business days shall not include Saturday/Sunday and holidays and Calendar days is including all days shall be used in calculating time periods.

R. Confidential:

The Buyer & Seller has agreed to not discuss the details of this Transaction with "outside influencers" (which means that is not involved with this transaction. By all terms and conditions, accepted purchase price, seller closing cost amount, and or anything about the seller during this transaction and 15 days after the transaction.

S. Open permits/ Liens on property:

a. Seller/ Buyer has/ has no information of open permits or liens on the property. If there is any open permits Buyer give Seller _____ days to clear all liens or open permits on the property.

BACK

NEXT

FIG. 45B

Contract
🏠 Buying a Home

Residential Sale and Purchase Agreement

T. Buyer Default
If/when Buyer fails, neglects, or refuses to perform the obligations of this Contract, Seller may elect to recover and retain the Earnest Money Deposit as liquidated damages Seller Default If/when Seller fails, neglects, or refuses to perform the obligations of this Contract Buyer may elect to receive return of Buyer's Deposit.

U. Offer Expiration
This offer expires 20 days

V. Walk through:
a. Buyer may perform a walk-through inspection of the Property solely to confirm that all items of Personal Property are on the Property and to verify that Seller has maintained the Property as required

W. Licensed Real Estate Agents:
a. Any Licensed Real Estate Agents/ Brokers/s hired the services of representations by either party Buyer/ Seller is not responsible for any representations or guaran fees. This agreement is "Do-it your self Real Estate" By hiring a Licensed Broker/Agent the Buyer/Seller are responsible for payment for their services outlined in a personal written agreements not a part of this transaction.

FIG. 46A

X. Acceptance

Seller warrants that Seller is the owner of the Property or has the authority to execute this Agreement. Therefore, by the Seller's authorization below, he/she/they accepts the above offer and agrees to sell the Property on the above terms and conditions and agrees to the agency relationships in accordance with any agreement(s) made with/ without licensed real estate agent(s).

Y. Entire Agreement

This Agreement together with any attached addendums or disclosures shall supersede any and all other prior understandings and agreements, either oral or in writing, between the parties with respect to the subject matter hereof and shall constitute the sole and only agreements between the parties with respect to the said Property. All prior negotiations and agreements between the parties with respect to the Property hereof are merged into this Agreement. Each party to this Agreement acknowledges that no representations, inducements, promises, or agreements, orally or otherwise, have been made by any party or by anyone acting on behalf of any party, which are not embodied in this Agreement and that any agreement, statement promise that is not contained in this Agreement shall not be valid or binding or of any force or effect.

Z. Possession

At Closing, Seller shall have removed all personal Buyer assumes all risks of loss to the Property from date of occupancy

[BACK] [SUBMIT]

Let's get started

Buying a Home

Thank you for your patience

A professional will review your comments will be a updated list of houses will be sent to your email within 24 hours.

FIG. 55A who agrees to buy AND Seller

First Name | Last Name

Address

City | Miami | State | FL who agrees to sell and convey real and personal property as described in Sections A & B.

Buyer and Seller shall be collectively known as the "Parties."

Legal Description. (Populated XXXXXXXX)

BACK | CONTINUE

FIG. 55B

This Real Estate Purchase Agreement ("Agreement")

The real property is a:

Address

Tax Parcel Information (i.e., "Parcel ID" or "Tax Map & Lot") (Populated XXXXXXX) Once submitted)

Will there be Any personal property that is included in the sale?

YES

Write in all the items

Earnest Money deposit

After acceptance by all Parties, the Buyer agrees to make a payment in the amount of as consideration by

FIG. 56A

After acceptance by all Parties, the Buyer agrees to make a payment in the amount of as consideration by

MM/DD/YYYY
01/23/2020

☐ The Earnest Money shall be applied to the Purchase Price at Closing and subject to the Buyer's ability to perform under the terms of this Agreement. Any Earnest Money has already been accepted or $ Purchase Price and Terms: The Buyer agrees to purchase the Property by payment of

BACK    CONTINUE

Sale of another Property: Buyer's performance under this Agreement:
- Shall not be contingent upon selling another property.
- Shall be contingent upon selling another property. Buyer
- is
- is not contingent on the lease, sale, or recording of another property.

FIG. 57B

This Real Estate Purchase Agreement ("Agreement")

Closing Costs:

The costs attributed to the Closing of the Property shall be the responsibility of ☐ Buyer
☐ Seller
☐ Both Parties

Title: The fees and costs related to the Closing shall include but not be limited to a title search (including the abstract and any owner's title policy), preparation of the deed, transfer taxes, recording fees, and any other costs by the title company that is in standard procedure with conducting the sale of a property. Seller shall convey title to the property by warranty deed or equivalent. The Property may be subject to restrictions contained on the plat, deed, covenants, conditions, and restrictions, or other documents noted in a Title Search Report. Upon execution of this Agreement by the Parties, Seller will, at the shared expense of both Buyer and Seller, order a Title Search Report and have delivered to the Buyer. Upon receipt of the Title Search Report, the Buyer shall have 10 business days to notify the Seller, in writing, of any matters disclosed in the report which are unacceptable to Buyer. Buyer's failure to timely object to the report shall constitute acceptance of the Title Search Report. If any objections are made by Buyer regarding the Title Search Report, mortgage loan inspection, or other information that discloses a material defect, the Seller shall have 10 business days from the date the objections were received to correct said matters. If Seller does not remedy any defect discovered by the Title Search Report, Buyer shall have the option of canceling this Agreement, in which case the Earnest Money shall be returned to Buyer

FIG. 58A

Closing Date: mm/dd/yyyy

Any extension of the Closing must be agreed upon, in writing, by Buyer and Seller

Survey: Buyer may obtain a survey of the Property before the Closing to assure that there are no defects, encroachments, overlaps, boundary line or acreage disputes, or other such matters, that would be disclosed by a survey (Survey Problems). The cost of the survey shall be paid by the Buyer. Not later than 3 business days prior to the Closing, Buyer shall notify Seller of any Survey Problems which shall be deemed to be a defect in the title to the Property. Seller shall be required to remedy such defects within 5 business days and prior to the Closing. If Seller does not or cannot remedy any such defect(s), Buyer shall have the option of canceling this Agreement, in which case the Earnest Money shall be returned to Buyer.

BACK  CONTINUE

FIG. 58B

This Real Estate Purchase Agreement ("Agreement")

Mineral Rights: It is agreed and understood that all rights under the soil, including but not limited to water, gas, oil, and mineral rights shall be transferred by the Seller to the Buyer at Closing. After Closing, Buyer shall receive an owner's standard form policy of title insurance insuring marketable title in the Property to Buyer in the amount of the Purchase Price, free and clear of the objections and all other title exceptions agreed to be removed as part of this transaction

Property Condition: Seller agrees to maintain the Property in its current condition, subject to ordinary wear and tear, from the time this Agreement comes into effect until the Closing

Inspections: Buyer is required to perform their own inspections, tests, and investigations to the property Buyer will have

Inspection days: [MM/DD/YYYY]

days to handle all inspections. If the buyer reveal issues with the property a both Parties cannot come to an agreement, this Agreement shall be contingent. If the Buyer fails to have the Property inspected or does not provide the Seller with written notice before the ending term with this Agreement. Buyer hereby accepts the Property in its current condition and as described in any disclosure forms presented by the Seller neither Seller shall be not be bound to any representation or warranty of any kind relating in any way to the Property or its condition, quality or quantity, except as specifically set forth in this Agreement or any property disclosure, which contains representations of the Seller only, and which is based upon the best of the Seller's personal knowledge.

FIG. 59A

Appraisal: Buyer's performance under this Agreement: (check one)

○ Shall not be contingent upon the appraisal of the Property being equal to or greater than the agreed upon Purchase Price.

 Shall be contingent upon the appraisal of the Property being equal to or greater than the agreed upon Purchase Price.

If the Property does not appraise to at least the amount of the Purchase Price. The Parties shall have 5 business days to re-negotiate this Agreement ("Re-Negotiation Period"). In such event the Parties cannot come to an agreement during the Re-Negotiation Period, this Agreement shall terminate with the Earnest Money being returned to the Buyer.

[BACK]   [CONTINUE]

FIG. 59B

This Real Estate Purchase Agreement ("Agreement")

Required Documents: Prior to the Closing, all Parties agree to authorize all necessary documents, in good faith, in order to record the transaction under the conditions required by the recorder, title company, lender, or any other public or private entity.

Termination: In the event this Agreement is terminated, as provided in this Agreement, absent of default, any Earnest Money shall be returned to the Buyer, in-full, within 7 business days with all parties being relieved of their obligations as set forth herein.

Time: Calendar days will be used in computing time periods time for acceptance and Effective Date and any time periods provided for in this Contract which shall end or occur on a Saturday, Sunday, or a national legal holiday of the next business day

Buyer's Default: Seller's remedies shall be limited to liquidated damages in the amount of the Earnest Money, it is agreed that such payments and things of value are liquidated damages and are Seller's sole and only remedy for Buyer's failure to perform the obligations of this Agreement. The Parties agree that Seller's actual damages in the event of Buyer's default would be difficult to measure, and the amount of the liquidated damages herein provided for is a reasonable estimate of such damages.

FIG. 60A

Seller's Default: Buyer may elect to treat this Agreement as cancelled, in which case all Earnest Money paid by Buyer hereunder shall be returned and Buyer may recover such damages as may be proper, or Buyer may elect to treat this Agreement as being in full force and effect and Buyer shall have the right to specific performance or damages or both.

Earnest Money Dispute: Notwithstanding any termination of this Agreement, the Parties agree that in the event of any controversy regarding the release of the Earnest Money that the matter shall be submitted to mediation.

Dispute Resolution: Buyer and Seller agree to mediate any dispute or claim arising out of this Agreement, or in any resulting transaction, before resorting to arbitration or court action.

Mediation: If a dispute arises, between or among the Parties, and it is not resolved prior to or after recording the to submit the matter to mediation. Costs related to mediation shall be mutually shared between or among the Parties. Unless otherwise agreed in mediation, the Parties retain their rights to proceed to arbitration or litigation.

[BACK]　　[CONTINUE]

FIG. 60B

This Real Estate Purchase Agreement ("Agreement")

Arbitration: The Parties agree that any dispute or claim in law or equity arising between them out of this Agreement or any resulting transaction

Terms and Conditions of Offer. This is an offer to purchase the Property in accordance with the above stated terms and conditions of this Agreement. If at least one, but not all, of the Parties initial such pages, a counter offer is required until an agreement is reached. Seller has the right to continue to offer the Property for sale and to accept any other offer at any time prior to notification of acceptance. If this offer is accepted and Buyer subsequently defaults, Buyer may be responsible for payment. This Agreement and any supplement, addendum or modification, including any copy, may be signed in two or more counterparts, all of which shall constitute one and the same writing.

Binding Effect: This Agreement shall be for the benefit of, and be binding upon, the Parties, their heirs, successors, legal representatives, and assigns, which therefore, constitutes the entire agreement between the Parties. No modification of this Agreement shall be binding unless signed by both Buyer and Seller.

FIG. 61A

Severability: In the event any provision or part of this Agreement is found to be invalid or unenforceable, only that particular provision or part so found, and not the entire Agreement, will be inoperative. Offer Expiration. This offer to purchase the Property as outlined in this Agreement shall be deemed revoked and the Earnest Money shall be returned unless this Agreement is signed by Seller and a copy of this Agreement is personally given to the Buyer by Date: MM/DD/YYYY

Acceptance. Seller warrants that Seller is the owner of the Property or has the authority to execute this Agreement. Therefore, by the Seller's authorization below, he/she/they accepts the above offer and agrees to sell the Property on the above terms and conditions and agrees to the agency relationships in accordance with any agreement(s) made with/ without licensed real estate agent(s).

Licensed Real Estate Agent(s). If Buyer or Seller have hired the services of licensed real estate agent(s) to perform representation on their behalf, he/she/they shall be entitled to payment for their services as outlined in their separate written agreement.

BACK

This Real Estate Purchase Agreement ("Agreement")

Disclosures. It is acknowledged by the Parties that: (check one)

☐ There are no attached addendums or disclosures to this Agreement.
☐ The following addendums or disclosures are attached to this Agreement:

☐ Lead-Based Paint Disclosure Form

☐ Condo
☐ Homeowners' Assn.
☐ Seller Financing
☐ FHA/VA Financing
☐ Appraisal Contingency
☐ Short Sale
☐ Lead Paint Disclosure (Pre-1978)

☐ Housing for Older Persons
☐ Lease Purchase/Lease Option
☐ Pre-Closing Occupancy
☐ Post-Closing Occupancy
☐ Sale of Buyer's Property
☑ Additional Terms and Conditions

FIG. 62A

Entire Agreement. This Agreement together with any attached addendums or disclosures shall supersede any and all other prior understandings and agreements, either oral or in writing, between the parties with respect to the subject matter hereof and shall constitute the sole and only agreements between the parties with respect to the said Property. All prior negotiations and agreements between the parties with respect to the Property hereof are merged into this Agreement. Each party to this Agreement acknowledges that no representations, inducements, promises, or agreements, orally or otherwise, have been made by any party or by anyone acting on behalf of any party, which are not embodied in this Agreement and that any agreement, statement promise that is not contained in this Agreement shall not be valid or binding or of any force or effect.

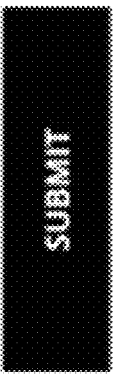

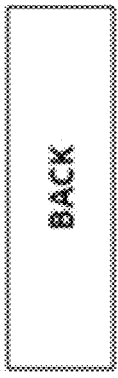

FIG. 62B

Summary of the contract

Seller Information: Alex Smith
Tax ID Of The Property: 123456789
Legal Description: Lorem ipsum goes here Buyer (s) Alexander Robinson submitted an offer for property located on Loremipsum st. at Miami, FL, USA. (With/without) personal property included at a purchase price of $100,000.00 The buyer agrees to use Lorem ipsum Inc. Title company and will put down $1000.00 in escrow. The Buyer is/is not approved with Bank of America Bank.

Buyer chooses to use Julia Robinson as Title and Escrow agent in this transaction. Closing date shall be on or before 11.01.2020. Buyer elects that this contract shall be/not be contingent on the buyer selling a property. Buyer will have 10 days to inspect the property and can cancel the contract at any time before that. Appraisal will be ordered on Lorem ipsum. All liens and open permits shall be paid prior to closing. The seller has 10 days to accept this offer. Buyer/Seller has/has not chosen a Real Estate licensed agent to work with them in this transaction.

BACK

NEXT

FIG. 63

This Real Estate Purchase Agreement ("Agreement")

Made on October 01, 2020 between: Buyer Alexander Robinson with a mailing address of Loremipsum St. City of Miami state of FL who agrees to buy AND Seller Julia Anderson with a mailing address of Loremipsum St. City of Miami state of FL who agrees to sell and convey real and personal property as described in Sections A & B.

Buyer and Seller shall be collectively known as the "Parties."

Legal Description. (Populated XXXXXXXX)

The real property is a: Loremipsum St, Miami, FL, 3000, USA

Tax Parcel Information (i.e., "Parcel ID" or "Tax Map & Lot"): Populated XXXXXXX Personal Property Loremipsum dolor

Earnest Money deposit $500.00

FIG. 64A

After acceptance by all Parties, the Buyer agrees to make a payment in the amount of as consideration by October 10, 2020

The Earnest Money shall be applied to the Purchase Price at Closing and subject to the Buyer's ability to perform under the terms of this Agreement. Any Earnest Money has already been accepted Purchase Price and Terms: The Buyer agrees to purchase the Property by payment of $500,000.00

Cash Offers: No loan or financing of any kind is required to purchase the Property. Buyer shall provide Seller written third (3rd) party documentation verifying Proof of funds to close on or before October 30, 2020 Seller shall have three (3) business days after the receipt of such documentation to notify Buyer, in writing, if the verification of funds is not acceptable. If Buyer fails to provide such documentation, or if Seller finds such verification of funds is not acceptable, Seller may terminate this Agreement. Failure of Seller to provide Buyer written notice of objection to such verification shall be considered acceptance of verification of funds.

Bank Financing The Buyer's ability to purchase the Property is contingent upon the Buyer's ability to obtain financing under the following loan Lorem Type.

NEXT

FIG. 64B

This Real Estate Purchase Agreement ("Agreement")

Mineral Rights: It is agreed and understood that all rights under the soil, including but not limited to water, gas, oil, and mineral rights shall be transferred by the Seller to the Buyer at Closing. After Closing, Buyer shall receive an owner's standard form policy of title insurance insuring marketable title in the Property to Buyer in the amount of the Purchase Price, free and clear of the objections and all other title exceptions agreed to be removed as part of this transaction.

Property Condition: Seller agrees to maintain the Property in its current condition, subject to ordinary wear and tear, from the time this Agreement comes into effect until the Closing.

Inspections: Buyer is required to perform their own inspections, tests, and investigations to the property Buyer will have 15 days to handle all inspections. If the buyer reveal issues with the property a both Parties cannot come to an agreement, this Agreement shall be contingent. If the Buyer fails to have the Property inspected or does not provide the Seller with written notice before the ending term with this Agreement, Buyer hereby accepts the Property in its current condition and as described in any disclosure forms presented by the Seller neither Seller shall be not be bound to any representation or warranty of any kind relating in any way to the Property or its condition, quality or quantity, except as specifically set forth in this Agreement or any property disclosure, which contains representations of the Seller only, and which is based upon the best of the Seller's personal knowledge.

Appraisal: Buyer's performance under this Agreement

FIG. 65A

Shall not be contingent upon the appraisal of the Property being equal to or greater than the agreed upon Purchase Price.

If the Property does not appraise to at least the amount of the Purchase Price. The Parties shall have 5 business days to re-negotiate this Agreement (Re-Negotiation Period). In such event the Parties cannot come to an agreement during the Re-Negotiation Period, this Agreement shall terminate with the Earnest Money being returned to the Buyer.

Required Documents: Prior to the Closing, all Parties agree to authorize all necessary documents, in good faith, in order to record the transaction under the conditions required by the recorder, title company, lender, or any other public or private entity.

Termination: In the event this Agreement is terminated, as provided in this Agreement, absent of default, any Earnest Money shall be returned to the Buyer, in-full, within 7 business days with all parties being relieved of their obligations as set forth herein.

[NEXT]

[BACK]

FIG. 65B

This Real Estate Purchase Agreement ("Agreement")

Time: Calendar days will be used in computing time periods time for acceptance and Effective Date and any time periods provided for in this Contract which shall end or occur on a Saturday, Sunday, or a national legal holiday of the next business day.

Buyer's Default: Seller's remedies shall be limited to liquidated damages in the amount of the Earnest Money. It is agreed that such payments and things of value are liquidated damages and are Seller's sole and only remedy for Buyer's failure to perform the obligations of this Agreement. The Parties agree that Seller's actual damages in the event of Buyer's default would be difficult to measure, and the amount of the liquidated damages herein provided for is a reasonable estimate of such damages.

Seller's Default: Buyer may elect to treat this Agreement as cancelled, in which case all Earnest Money paid by Buyer hereunder shall be returned and Buyer may recover such damages as may be proper, or Buyer may elect to treat this Agreement as being in full force and effect and Buyer shall have the right to specific performance or damages, or both.

Earnest Money Dispute: Notwithstanding any termination of this Agreement, the Parties agree that in the event of any controversy regarding the release of the Earnest Money that the matter shall be submitted to mediation.

Dispute Resolution. Buyer and Seller agree to mediate any dispute or claim arising out of this Agreement, or in any resulting transaction, before resorting to arbitration or court action

FIG. 66A

Mediation: If a dispute arises, between or among the Parties, and it is not resolved prior to or after recording the to submit the matter to mediation. Costs related to mediation shall be mutually shared between or among the Parties. Unless otherwise agreed in mediation, the Parties retain their rights to proceed to arbitration or litigation

Arbitration: The Parties agree that any dispute or claim in law or equity arising between them out of this Agreement or any resulting transaction

Terms and Conditions of Offer. This is an offer to purchase the Property in accordance with the above stated terms and conditions of this Agreement. If at least one, but not all, of the Parties initial such pages, a counter offer is required until an agreement is reached. Seller has the right to continue to offer the Property for sale and to accept any other offer at any time prior to notification of acceptance. If this offer is accepted and Buyer subsequently defaults, Buyer may be responsible for payment. This Agreement and any supplement, addendum or modification, including any copy, may be signed in two or more counterparts, all of which shall constitute one and the same writing.

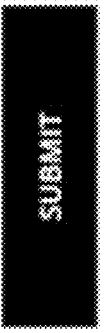

FIG. 66B

This Real Estate Purchase Agreement ("Agreement")

Binding Effect: This Agreement shall be for the benefit of, and be binding upon, the Parties, their heirs, successors, legal representatives, and assigns, which therefore, constitutes the entire agreement between the Parties. No modification of this Agreement shall be binding unless signed by both Buyer and Seller.

Severability: In the event any provision or part of this Agreement is found to be invalid or unenforceable, only that particular provision or part so found, and not the entire Agreement, will be inoperative.

Offer Expiration. This offer to purchase the Property as outlined in this Agreement shall be deemed revoked and the Earnest Money shall be returned unless this Agreement is signed by Seller and a copy of this Agreement is personally given to the Buyer by October 30,2020

Acceptance. Seller warrants that Seller is the owner of the Property or has the authority to execute this Agreement. Therefore, by the Seller's authorization below, he/she/they accepts the above offer and agrees to sell the Property on the above terms and conditions and agrees to the agency relationships in accordance with any agreement(s) made with/ without licensed real estate agent(s).

Licensed Real Estate Agent(s). If Buyer or Seller have hired the services of licensed real estate agent(s) to perform representation on their behalf, he/she/they shall be entitled to payment for their services as outlined in their separate written agreement.

FIG. 67A

Disclosures. It is acknowledged by the Parties that:
- There are no attached addendums or disclosures to this Agreement.
  - Condo
  - Homeowners' Assn.
  - Seller Financing
  - FHA/VA Financing
  - Appraisal Contingency
  - Short Sale

Entire Agreement. This Agreement together with any attached addendums or disclosures shall supersede any and all other prior understandings and agreements, either oral or in writing, between the parties with respect to the subject matter hereof and shall constitute the sole and only agreements between the parties with respect to the said Property. All prior negotiations and agreements between the parties with respect to the Property hereof are merged into this Agreement. Each party to this Agreement acknowledges that no representations, inducements, promises, or agreements, orally or otherwise, have been made by any party or by anyone acting on behalf of any party, which are not embodied in this Agreement and that any agreement, statement or promise that is not contained in this Agreement shall not be valid or binding or of any force or effect.

BACK

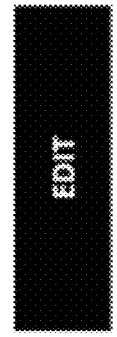

 Print

FIG. 67B

COMPUTER-IMPLEMENTED AND INTERACTIVE REAL ESTATE CONTRACT GENERATION AND EDITING PROCESS

FIELD OF THE INVENTION

The present invention relates generally to real estate contracts, and, more particularly, relates to a computer-implemented and interactive real estate contract generation and editing process.

BACKGROUND OF THE INVENTION

Real estate purchase agreements are generally drafted by a few select categories of qualified individuals, namely, real estate agents or attorneys. As a result, parties looking to buy and/or sell real estate are typically forced to solicit the assistance of these qualified individuals and wait for said individuals to draft, edit, revise, and finalize the subject purchase agreement before being able to proceed with the additional steps involved in a purchase and sale transaction, e.g., appraisal, financing, closing, etc. In many cases, this dependence on such a select group of individuals results in the loss of valuable time that may jeopardize the success of purchase and sale transactions, particularly where such transactions are time-sensitive, subject to conditions, or occurring in a market with more demand than supply.

There are some known computer-implemented methods and systems for generating contracts. These known methods and systems fail to provide adequate information and direction to putative buyers and/or seller. Additionally, these known methods and systems are also typically confusing to navigate through.

Therefore, a need exists to overcome the problems with the prior art as discussed above.

SUMMARY OF THE INVENTION

The invention provides a computer-implemented and interactive real estate contract generation and editing process that overcomes the hereinafore-mentioned disadvantages of the heretofore-known devices and methods of this general type and that beneficially allows any user to easily, quickly, and conveniently draft purchase and sale transactions from the comfort of an electronic device owned or utilized by the user.

With the foregoing and other objects in view, there is provided, in accordance with the invention, a computer-implemented and interactive real estate contract generation and editing process comprising the steps of providing a first electronic computing device of a first user and a computer server; communicatively coupling the first electronic computing device of the first user to the computer server over a wireless communication network and generating a digital graphical user interface (GUI) on an electronic display of the first computing device with a plurality of digital data input fields operably configured to receive alpha-numeric text; initiating a network-based remote easy contract formation session that includes selecting a plurality of GUI icons on the electronic display of the first computing device and inputting contract formation data into each of the plurality of digital data input fields; and generating a digital document in the network-based remote easy contract formation session with a plurality of independent preformed paragraphs each having at least one fillable contract data field disposed therein and assigned and filled in with, using an array data structure, to one of the plurality of digital data input fields to create a finalized digital document without any fillable contract data field therein and that is downloadable to the electronic display of the first computing device.

In accordance with another feature, the first electronic computing device of the first user is geographically located at a different physical building location than the computer server.

In accordance with another feature, an embodiment of the present invention includes the step of communicatively coupling the first electronic computing device of the first user to the computer server over the wireless communication network and registering into a user account resident on the computer server before generating the digital GUI on the electronic display of the first computing device.

In accordance with a further feature of the present invention, the computer-implemented and interactive real estate contract generation and editing process further comprises the step of generating the finalized digital document without fillable contract data field therein and that is transferrable from the electronic display of the first computing device to a second computing device of a second user over the wireless communication network.

In accordance with a further feature of the present invention, the computer-implemented and interactive real estate contract generation and editing process also includes a digital informational icon disposed proximal to each of the plurality of digital data input fields and having informational text included therein; and displaying the informational text on the electronic display of the first computing device upon selectively modulating the digital informational icon.

In accordance with the present invention, an embodiment of the present invention includes a plurality of independent and sequentially viewable windows within the network-based remote easy contract formation session that collectively form part of selecting the plurality of GUI icons on the electronic display of the first computing device and the inputting contract formation data into each of the plurality of digital data input fields, the plurality of independent and sequentially viewable windows generating before generation of the digital document in the network-based remote easy contract formation session with the plurality of independent preformed paragraphs.

In accordance with another feature, an embodiment of the present invention also includes the step of initiating, in lieu of the network-based remote easy contract formation session, a network-based remote do-it-yourself contract formation session that includes generating a digital document with a plurality of GUI icons on the electronic display of the first computing device, with a plurality of independent preformed paragraphs each having at least one digital data input field therein, and filling in the at least one digital data input field to create a finalized digital document without any fillable contract data field therein and that is downloadable to the electronic display of the first computing device.

In accordance with yet another feature, an embodiment of the present invention includes a plurality of independent and sequentially viewable windows within the network-based remote do-it-yourself contract formation session that collectively form part of the digital document with the plurality of GUI icons on the electronic display of the first computing device.

In accordance with a further feature of the present invention, the computer-implemented and interactive real estate contract generation and editing process also includes selectively choosing on the first electronic computing device of a first user one of either the easy contract formation session or the do-it-yourself contract formation session.

The present invention also provides a computer-implemented and interactive real estate contract generation and editing process comprising the steps of providing a first electronic computing device of a first user and a computer server; communicatively coupling the first electronic computing device of the first user to the computer server over a wireless communication network and generating a digital graphical user interface (GUI) on an electronic display of the first computing device with a plurality of digital data input fields operably configured to receive alpha-numeric text; initiating a network-based remote easy contract formation session that includes inputting contract formation data into each of the plurality of digital data input fields in a plurality of independent and sequentially viewable windows that collectively form part of selecting the plurality of GUI icons on the electronic display of the first computing device and the inputting contract formation data into each of the plurality of digital data input fields, the plurality of independent and sequentially viewable windows generating before generation of the digital document in the network-based remote easy contract formation session with the plurality of independent preformed paragraphs; and generating a digital document in the network-based remote easy contract formation session with a plurality of independent preformed paragraphs each having at least one fillable contract data input field disposed therein and assigned and filled in with one of the plurality of contract formation data to create a finalized digital document.

In accordance with the present invention, a computer-implemented and interactive real estate contract generation and editing process comprising the steps of providing a first electronic computing device of a first user and a computer server; communicatively coupling the first electronic computing device of the first user to the computer server over a wireless communication network and generating a digital graphical user interface (GUI) on an electronic display of the first computing device with a plurality of digital data input fields operably configured to receive alpha-numeric text; and initiating a network-based remote do-it-yourself contract formation session that includes generating a digital document on the electronic display of the first computing device, with a plurality of independent preformed paragraphs each having at least one digital data input field therein, and filling in the at least one digital data input field with contract formation data to create a finalized digital document.

Although the invention is illustrated and described herein as embodied in a computer-implemented and interactive real estate contract generation and editing process, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is a screen shot view of a sign-up page for users, in accordance with an exemplary embodiment of the present invention;

FIG. 8 is a screen shot view of a sign-in page for users, in accordance with the present invention;

FIG. 9 is a screen shot view of a forgot-your-password page for users, in accordance with the present invention;

Figure 11:
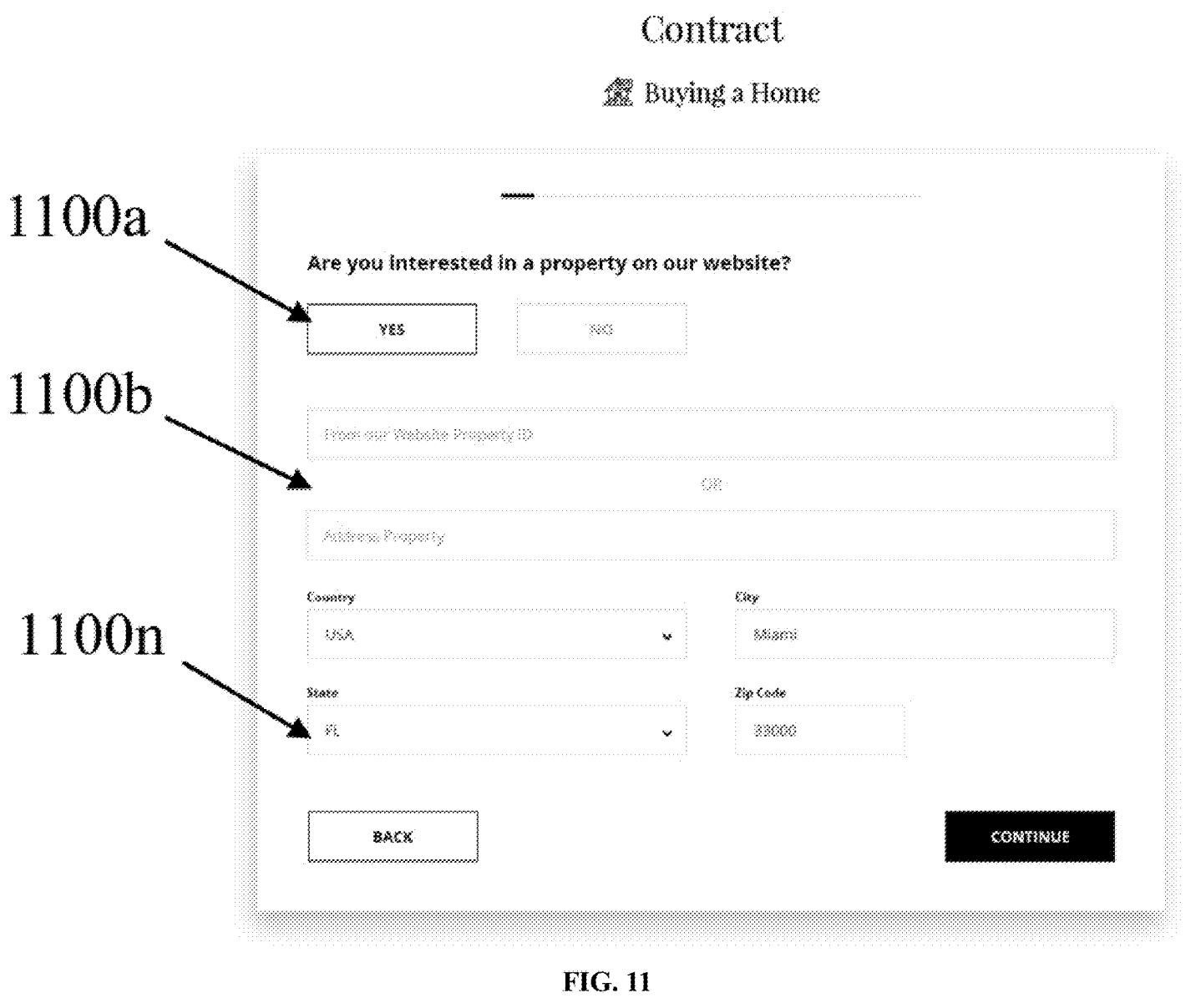

FIG. 11 is a screen shot view depicting the plurality of digital data input fields, in accordance with the present invention;

FIGS. 12-41 are screen shot views depicting the plurality of digital data input fields of the network-based remote easy contract formation session, in accordance with an exemplary embodiment of the present invention;

FIG. 42 is a screen shot view of a summary page of the network-based remote easy contract formation session, in accordance with the present invention;

FIGS. 43-46 are screen shot views of the finalized digital document without any fillable contract data field therein of the network-based remote easy contract formation session, in accordance with the present invention;

FIGS. 49-50 are screen shot views of the plurality of digital data input fields for requesting a professional list of properties available for purchase that fit the user's inputted criteria, in accordance with the present invention;

FIG. 51 is a screen shot view of a confirmation page for requesting a professional list of properties available for purchase that fit the user's inputted criteria, in accordance with the present invention;

Figure 55A:
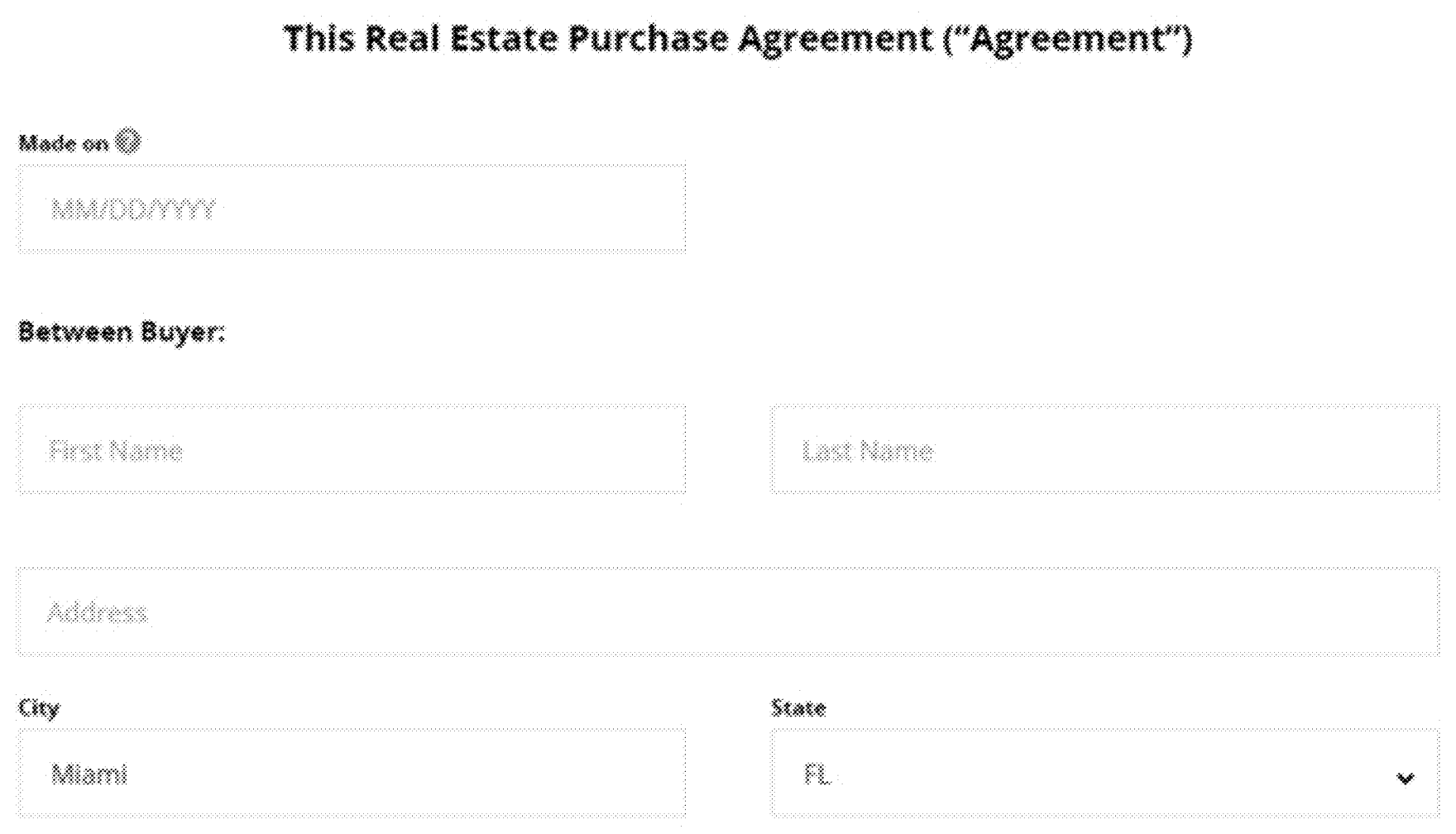
Figure 57A:
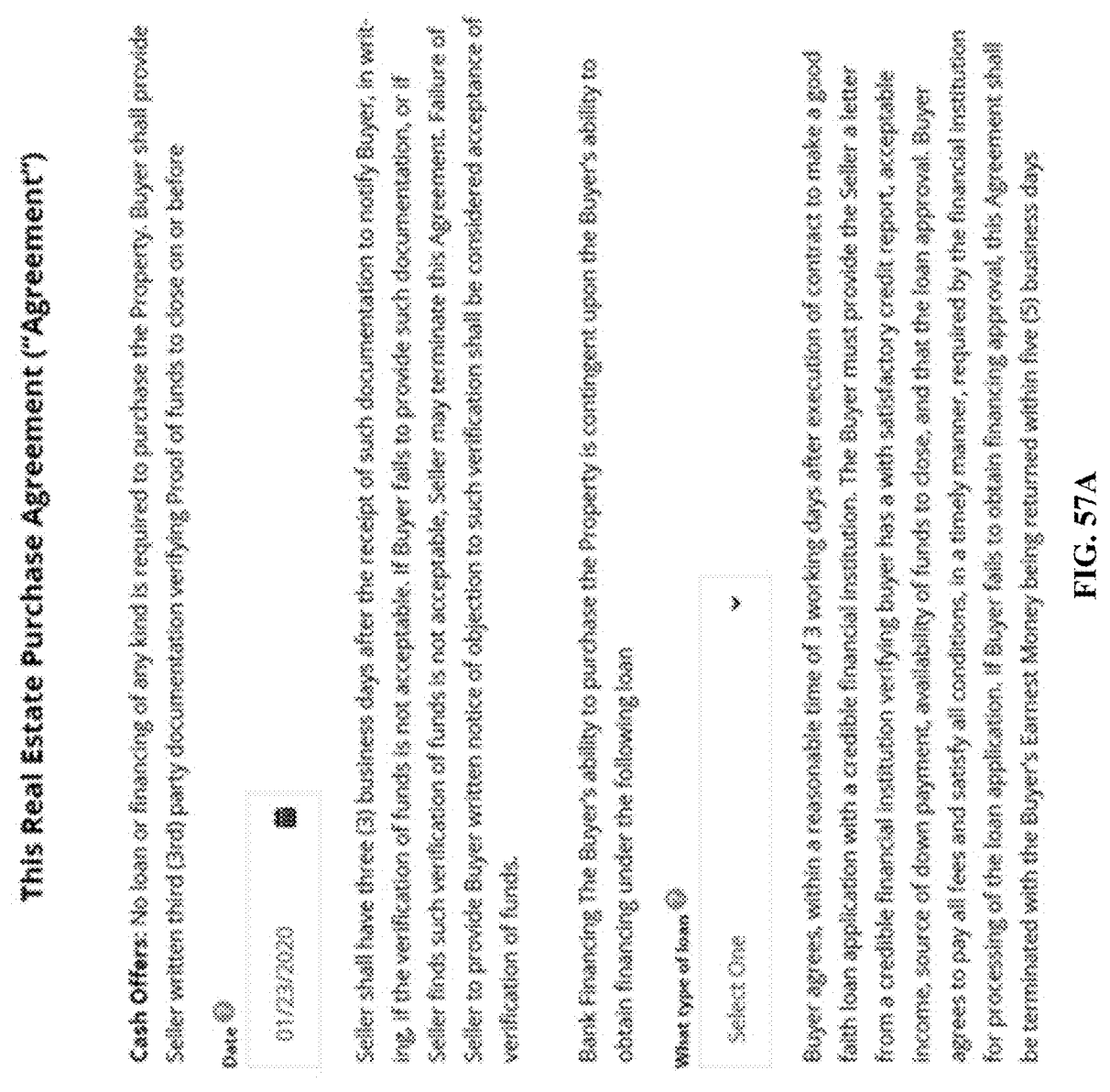

FIGS. 55-62 are screen shot views depicting the plurality of digital data input fields in the network-based remote do-it-yourself contract formation session, in accordance with an exemplary embodiment of the present invention;

FIG. 63 is a screen shot view of a summary page of the network-based remote do-it-yourself contract formation session, in accordance with the present invention; and FIGS. 64-67 are screen shots of the finalized digital document without any fillable contract data field therein of the network-based remote do-it-yourself contract formation session, in accordance with the present invention.

DETAILED DESCRIPTION

Figure 1:
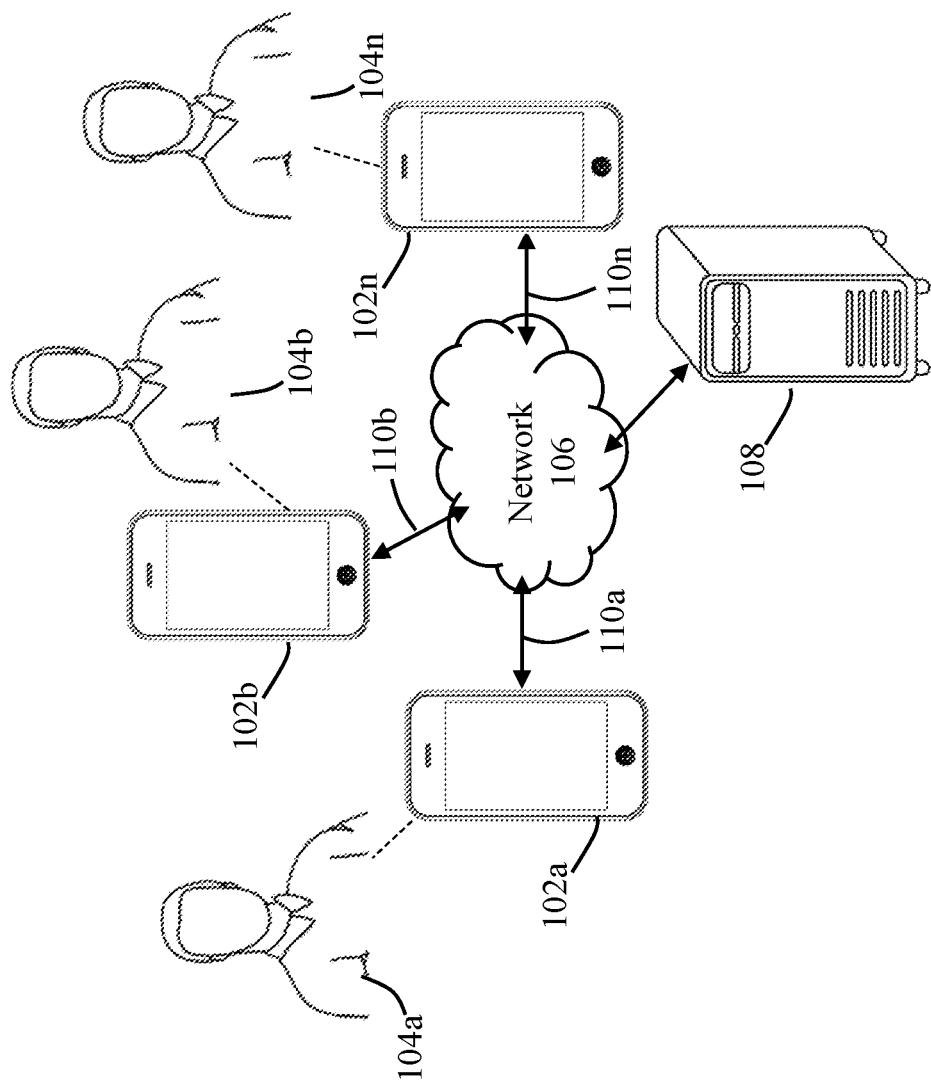
FIG. 1 is a block diagram of a computer-implemented and interactive real estate contract generation and editing process, in accordance with one exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient computer-implemented and interactive real estate contract generation and editing process that enables users, namely, real estate sellers and purchasers, to draft, edit, and finalize real estate purchase and sale agreements themselves rather than having to be dependent or reliant on a third party to do so, e.g., on a real estate agent or attorney. Embodiments of the invention provide a process that may be performed remotely over a wireless communication network and from any geographic location for greater convenience. In addition, embodiments of the invention provide a contract generation and editing process that is simple and easy to perform such that it may be performed by professionals as well as users who are inexperienced in the real estate industry without sacrificing the substantive integrity of the contract. The present invention also beneficially enables a user to selectively toggle or switch between an "easy" mode and a "do-it-yourself" mode, wherein the "easy" mode poses specific, directed questions to the user, the responses to which are then inserted into the digital real estate contract to form the finalized digital document, whereas the "do-it-yourself" mode grants the user the ability to fill in digital data input fields directly onto the digital document itself until a finalized digital document is achieved. As used herein, the term "easy" is solely used for naming purposes and should not be construed otherwise or interpreted in any other matter.

Figure 2:
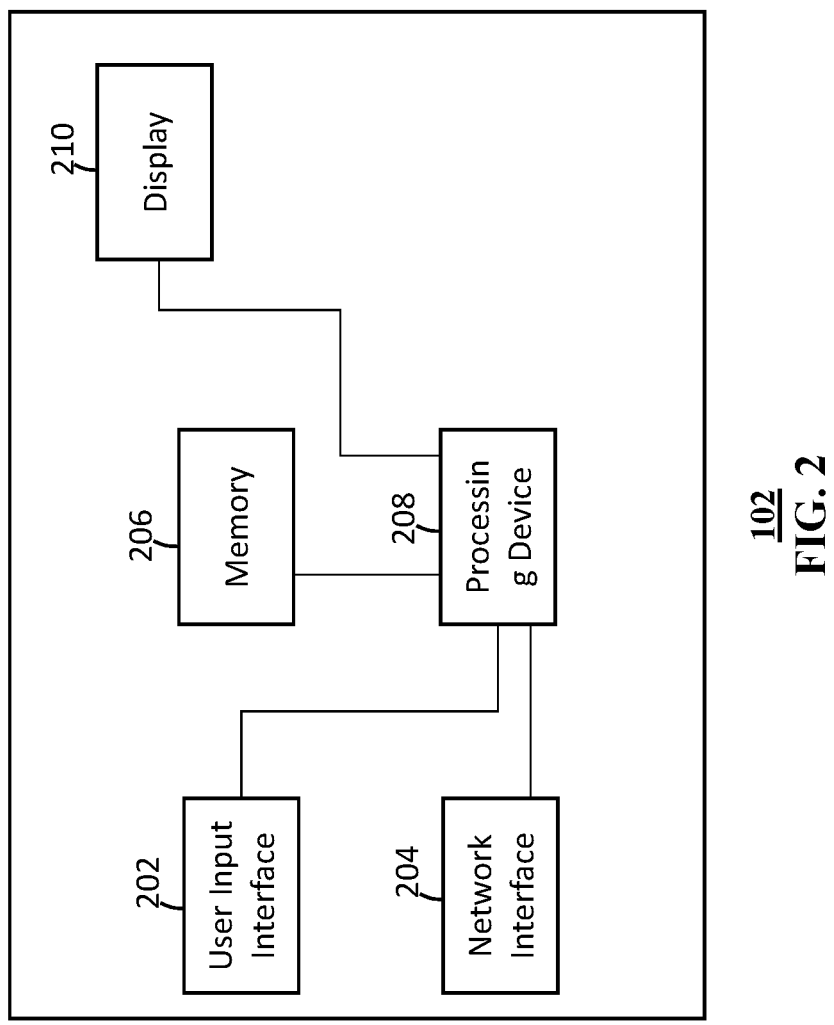
FIG. 2 is a block diagram of the exemplary computing device utilized in the computer-implemented and interactive real estate contract generation and editing process of FIG. 1, in accordance with the present invention.
Figure 3:
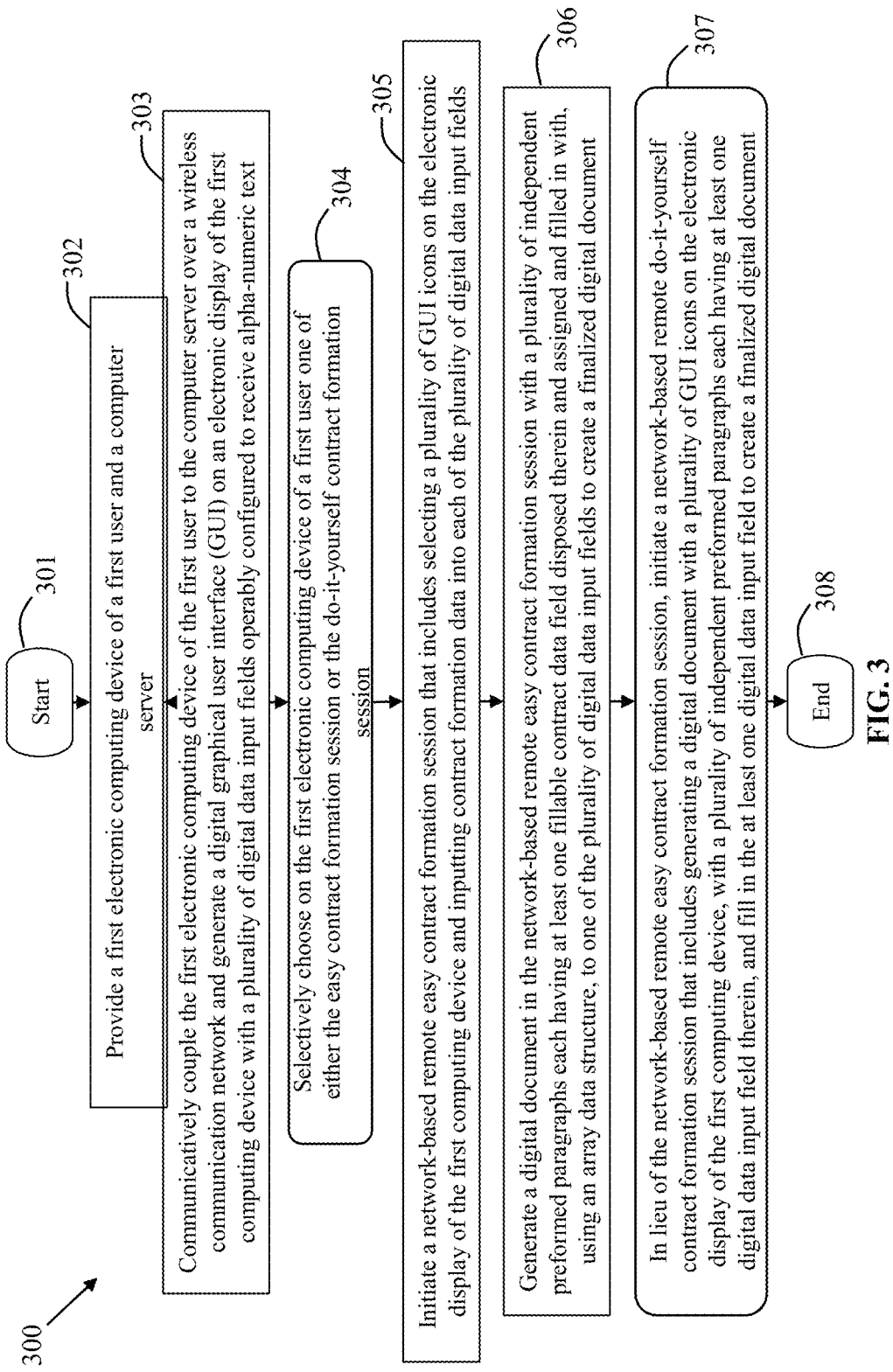
FIG. 3 is a process flow diagram depicting the steps associated with the computer-implemented and interactive real estate contract generation and editing process of FIG. 1, in accordance with one exemplary embodiment of the present invention.
Figure 5:
FIG. 5 is a screen shot view of a verification by email page for users, in accordance with the present invention.
Figure 6:
FIGS. 6-7 are screen shot views of a verification by phone page for users, in accordance with the present invention.
Figure 7:

Referring now to FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components. The first example of a computer-implemented and interactive real estate contract generation and editing process (referred to herein as the "process 300" for brevity), as shown in FIGS. 1-3, includes a first Step 302 of the process 300 which comprises providing a first electronic computing device 102a of a first user 104a, the electronic computing device 102a having an electronic display 210, a memory 206, a user input interface 202, and a network interface 204. In preferred embodiments, the first electronic computing device 102a may consist of a cell phone, smart phone, laptop, tablet, desktop computer, or other comparable electronic computing or processing device 208. The memory 206 is non-transitory wherein "non-transitory" is defined as a resident memory. The electronic computing devices 102a-n which may be a cellphone or tablet, for example, are operable to execute programming instructions embodied in the process 300 that can be received from a computer server 108 via a wide area network (WAN) 106. Said differently, the electronic computing devices 102a-n are operable to execute the programming instructions received from the computer server 108 over the WAN 106. In other embodiments, the process 300 is embodied in a web-based software application, a desktop software application, or a mobile device software app. In one embodiment, the WAN is the Internet. The Internet represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 106 also may be implemented as a number of different types of networks, such as for example, an Intranet, a local area network (LAN), or a cellular network. FIG. 1 is intended as an example, and not as an architectural limitation for the present invention. As shown in FIG. 1, the network 106 includes connections 110*a-n*, which are the medium used to provide communication links between various devices and computers connected together within the network 106. The connections 110*a-n* may be wired or wireless connections, but said connections are preferably wireless. A few exemplary wired connections are cable, phone line, and fiber optic. Exemplary wireless connections include radio frequency (RF) and infrared radiation (IR) transmission. Many other wired and wireless connections are known in the art and can be used with the present invention.

The network interface 204 may include one or more network interface cards (NIC) or a network controller. In some embodiments, the network interface 204 may include a personal area network (PAN) interface. The PAN interface may provide the capability for the user's computing devices to network using a short-range communication protocol, for example, a Bluetooth communication protocol. The PAN interface may permit one personal computing device to connect wirelessly to another personal computing device via a peer-to-peer connection. The network interface 204 may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device. Additionally, the network interface 204 may include the capability to connect to a wide area network (WAN) via a WAN interface. The WAN interface may permit a connection to, for example, a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

FIG. 3 will be described in conjunction with the process flow chart of FIGS. 1-2. Although FIG. 3 shows a specific order of executing the process 300 steps, the order of executing the steps may be changed relative to the order shown in certain embodiments. Also, two or more blocks shown in succession may be executed concurrently or with partial concurrence in some embodiments. Certain steps may also be omitted in FIG. 3 for the sake of brevity. In some embodiments, some or all of the process steps included in FIG. 3 can be combined into a single process.

A second Step 303 entails communicatively coupling the first electronic computing device 102*a* of the first user 104*a* to the computer server 108 over a wireless communication network 106 and generating a digital graphical user interface (GUI) 202 on an electronic display 210 of the first computing device 102*a* with a plurality of digital data input fields 1100*a-n*, wherein "n" refers to any number greater than one, operably configured to receive alpha-numeric text. In preferred embodiments, the process 300 is ran over a wireless communication network 106 though, as explained above, in alternate embodiments the process 300 may be run, for example, over wired networks. The plurality of digital data input fields 1100*a-n* may vary in form and substance. Specifically, the plurality of digital data input fields 1100*a-n* may be in the form of fill-in-the-blank input fields (as shown by 1100*b*), drop-down input fields (as shown by 1100*n*), pre-determined response input fields (as shown by 1100*a*), or a combination of the foregoing. For this reason, the term "alpha-numeric text" is defined as numerals, letters, punctuation, special characters, etc. whether pre-determined or inputted by the user. The specific substance of the plurality of digital data input fields 1100*a-n* may likewise vary in various embodiments but preferably relates to the contents of the real estate contract, e.g., identity of buyer(s), identity of seller(s), purchase price, method of payment (e.g., cash, loan, or other), length of offer, loan financing information, down payment information, title agent/company information, personal property, etc., wherein the foregoing subsets of information would be included only if and when applicable to the particular transaction at issue.

In accordance with a next Step 304, the first user 104*a* may selectively choose on the first electronic computing device 102*a* of the first user 104*a* one of either the "easy" contract formation session or the "do-it-yourself" contract formation session, wherein "easy" is solely used herein for naming purposes and should not be construed otherwise or interpreted in any other matter. As explained above, the "easy" mode poses specific, directed questions to the user 104*a*, the responses to which are then inserted into the digital real estate contract to form the finalized digital document. This type of contract formation session is preferred for users who are largely unfamiliar with real estate contracts or transactions and are in need of directed and/or assisted guidance with respect to the type of information that must be solicited, gathered, and included in the finalized digital document. FIGS. 11-46 depict the "easy" contract formation session. In contrast, the "do-it-yourself" formation session provides the user 104*a* with greater flexibility because it grants the user 104*a* the ability to fill in digital data input fields directly onto the digital document itself until a finalized digital document is achieved. As seen in FIGS. 55-67, the plurality of digital data input fields 1100*a-n* are contained within the body of the digital document itself. Accordingly, the "do-it-yourself" formation session may be preferable for experts, professionals, or other qualified individuals with experience in the real estate industry.

Figure 10:
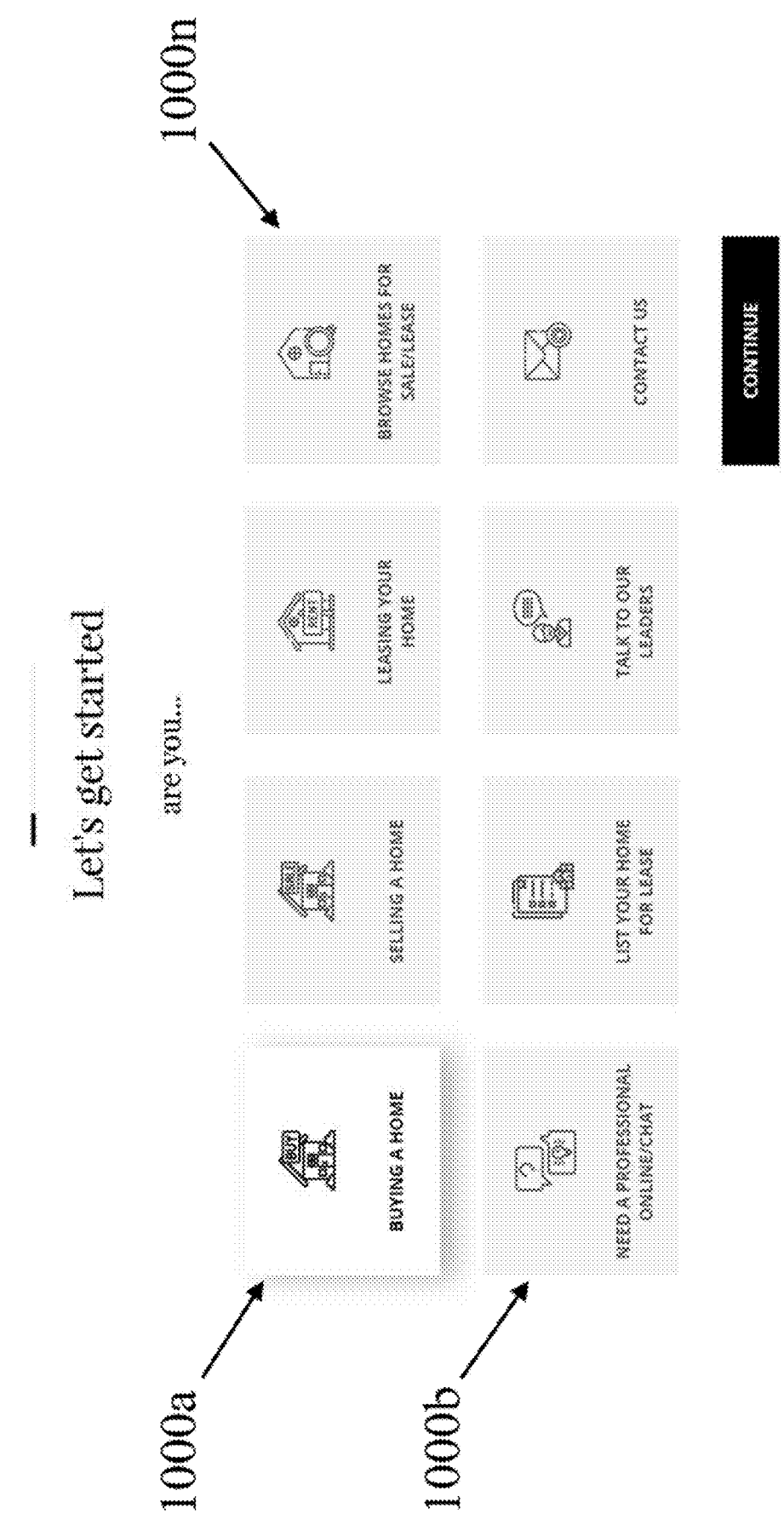
FIG. 10 is a screen shot view depicting the plurality of digital graphical user interface (GUI) icons of the computer-implemented and interactive real estate contract generation and editing process of FIG. 1, in accordance with the present invention.
Figure 12:
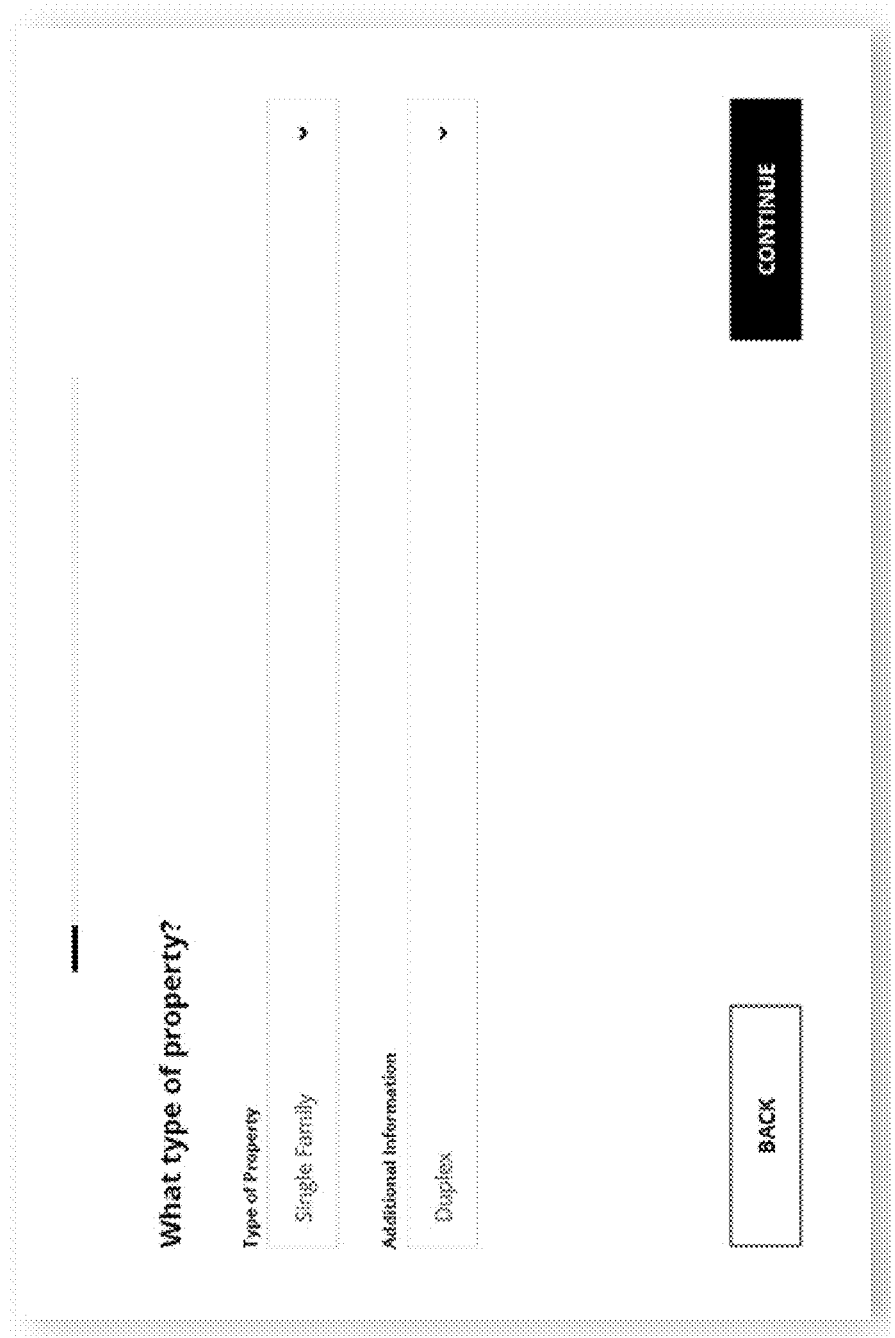
Figure 18:
Figure 20:
Figure 21:
Figure 23:
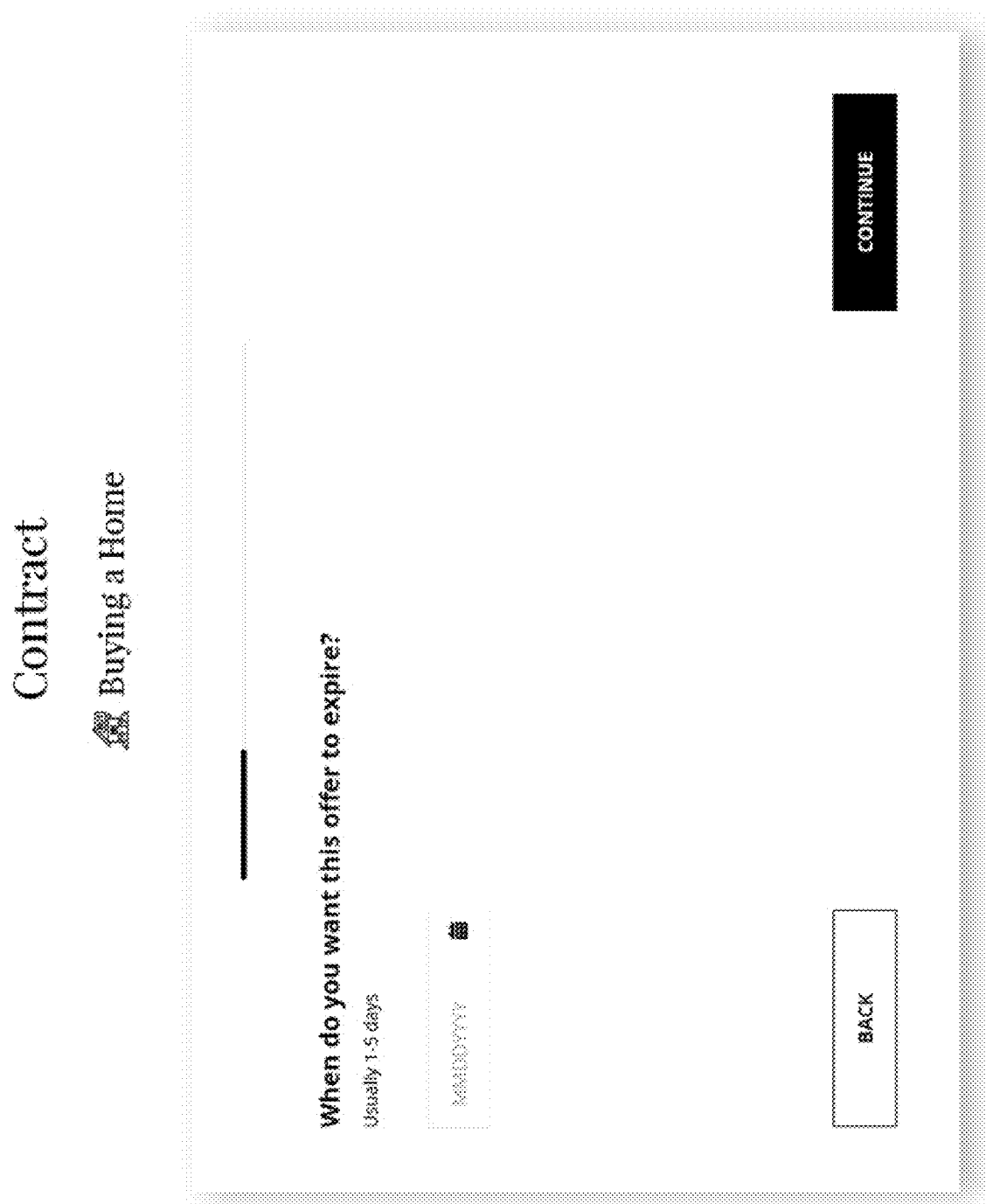
Figure 34:
Figure 40:
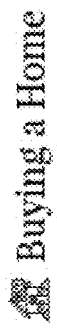
Figure 41:

A next Step 305 entails initiating a network-based remote "easy" contract formation session that includes selecting a plurality of GUI icons 1000*a-n* (as best depicted in FIG. 10) on the electronic display 210 of the first computing device 102*a* and inputting contract formation data into each of the plurality of digital data input fields 1100*a-n*. As seen in FIG. 10, the plurality of GUI icons 1000*a-n* prompt the user 104*a* to select the type of real estate transaction or contract the user 104*a* is seeking to prepare or draft. In alternate embodiments, however, the plurality of GUI icons 1000*a-n* may relate, for example, to a targeted component of the chosen transaction or contract, e.g., type of dwelling, type of financing, etc., and may appear in other steps of the process 300.

Once the user 104a has selected from the plurality of GUI icons 1000a-n and inputted all contract formation data into each of the plurality of digital data input fields 1100a-n, a final Step 306 includes generating a digital document in the network-based remote "easy" contract formation session with a plurality of independent preformed paragraphs each having at least one fillable contract data field disposed therein and assigned and filled in with, using an array data structure, to one of the plurality of digital data input fields to create a finalized digital document without any fillable contract data field therein and that is downloadable to the electronic display of the first computing device 102a. FIGS. 43-46 depict the finalized digital document that is generated at the conclusion of the "easy" contract formation session. In one embodiment, the finalized digital document is downloadable to the first computing device 102a so as to allow the user 104a the ability to readily save a copy of the finalized digital document for the user's personal records and/or for future use or dissemination. In another embodiment, the finalized digital document may be selectively and readily communicatively sharable with, or transferrable from the electronic display of the first computing device 102a to, a second computing device 102n of a second user 104n over the wireless communication network 106, e.g., the agent of the first user 104a or the other contracting party, to facilitate collaborative efforts and improve the speed and convenience of readily sharing the finalized digital document with other users 104a-n. In accordance with an alternate embodiment of the present invention, the finalized digital document may contain fillable contract data field(s) therein to be completed by another user 104b-n, e.g., the seller's agent, after being communicatively shared with the other user 104b-n over the network 106. In this way, the process 300 can be beneficially collaborative, allowing for multiple users 104a-n to contribute to the finalized digital document that is ultimately created. In the "easy" contract formation session, the one or more fillable contract data field(s) is filled in using an array data structure consisting of a collection of elements (i.e., values or variables), each identified by at least one array index or key. The array is then stored such that the position of each element can be computed from its index tuple by a mathematical formula. The array data structure may be one-dimensional or multidimensional.

In one embodiment, the first electronic computing device 102a of the first user 104a is geographically located at a different physical building location than the computer server 108. This feature beneficially allows the process 300 to be ran at various remote locations by the plurality of users 104a-n. Particularly where the plurality of users 104a-n seek to collaborate on any given real estate contract, this feature facilitates this collaboration as none of the users 104a-n are required to simultaneously be in a shared geographic location with each other or with the server 108 in order to perform the process 300.

The process 300 may further include the Step of communicatively coupling the first electronic computing device 102a of the first user 104a to the computer server 108 over the wireless communication network 106 and registering into a user account resident on the computer server 108 before generating the digital GUI 202 on the electronic display 210 of the first computing device 102a. Beneficially, this feature allows the user 104a to partially or fully complete a real estate contract through the "easy" contract formation session or the "do-it-yourself" contract formation session and save the user's progress so the user 104a may return to the digital contract at a later time, e.g., to complete, edit, revise, view, or share the digital contract over the network 106 at a later time. Said differently, the user account associated with the user 104a may contain all of the digital contracts prepared and saved by the user 104a. FIGS. 4-9 depict the steps associated with creating and retrieving user accounts. As seen in FIG. 4, the user 104a may be required to input select identifiable personal information, e.g., first and last name, email address, phone number, password, etc., to enable the server 108 to link the user 104a with a specific user account. The process 300 may include additional steps to verify the user account of a user 104a such as, by way of example and without limitation, verifying the email (FIG. 5) or phone number (FIGS. 6-7) of the user 104a by sending a one-time passcode to the user's email or phone number which the user 104a would then need to input to verify their identity and be granted access to the user account. To be granted access to the user account thereafter, the log-in credentials that correspond to the user's user account must be inputted (as depicted in FIG. 8). In the event the user 104a forgets their log-in credentials, there may be a method of retrieving said credentials or verifying the user's identity and resetting the credentials, e.g., by sending a verification code to the email address or phone number originally provided by the user 104a (as seen in FIG. 9).

Figure 49:
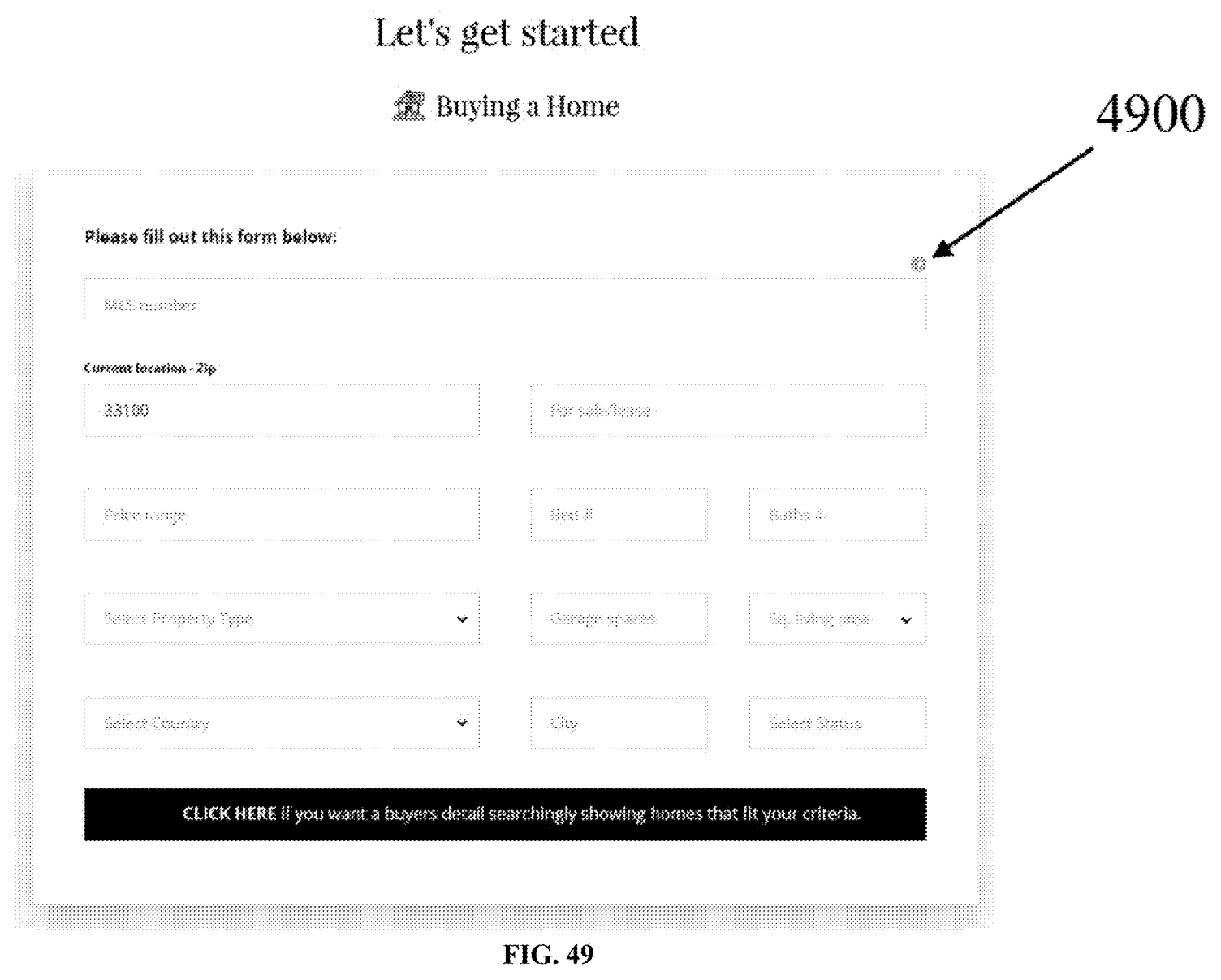

Referring now to FIG. 49, the process 300 may further comprise a digital informational icon 4900 disposed proximal to (wherein "proximal to" is defined herein as at or near) each of the plurality of digital data input fields 1100a-n and having informational text included therein; and displaying the informational text on the electronic display of the first computing device 102a upon selectively modulating the digital informational icon 4900. In an exemplary embodiment, the informational text that accompanies the digital informational icon 4900 offers descriptive, explanatory, and/or guiding text intended to better inform the user 104a of the type of information sought by the digital data input field 1100a associated with that particular digital informational icon 4900. In one embodiment, the informational text visually appears only when the user 104a selectively modulates, e.g., hovers over, selects, or clicks on, the digital informational icon 4900. This feature controls the amount of informational text the user 104a is exposed to at any given time so as to make each Step of the process 300 easier to understand and complete for the user 104a. In other words, this feature beneficially prevents the user 104a from being inundated with superfluous informational text that is pertinent at a later Step in the process 300, e.g., for a subsequent digital data input field 1100b, but that is not directly relevant to the digital data input field 1100a the user 104a is completing at that given moment. Likewise, a plurality of independent and sequentially viewable windows within the network-based remote "do-it-yourself" contract formation session may collectively form part of the digital document with the plurality of GUI icons on the electronic display of the first computing device 102a.

For this same beneficial purpose, namely, to aid the user 104a in understanding, organizing, and completing the process 300, the process 300 may also include a plurality of independent and sequentially viewable windows within the network-based remote "easy" contract formation session that collectively form part of selecting the plurality of GUI icons on the electronic display of the first computing device 102a and the inputting contract formation data into each of the plurality of digital data input fields 1100a-n, the plurality of independent and sequentially viewable windows generating before generation of the digital document in the network-based remote "easy" contract formation session with the plurality of independent preformed paragraphs. In this way, the plurality of digital data input fields 1100*a-n* are broken up into smaller parts reflected in a plurality of independent and sequentially viewable windows to make the process 300 easier, quicker, and simpler to perform.

In lieu of the network-based remote "easy" contract formation session, the user 104*a* may initiate the network-based remote "do-it-yourself" contract formation session that includes generating a digital document with a plurality of GUI icons on the electronic display of the first computing device 102*a*, with a plurality of independent preformed paragraphs each having one or more digital data input field(s) 1100*a* therein, and filling in the one or more digital data input field(s) 1100*a* to create a finalized digital document without any fillable contract data field therein and that is downloadable to the electronic display of the first computing device 102*a*. As such, Step 305 may comprise the foregoing as part of the network-based remote "do-it-yourself" contract formation session as opposed to initiating a network-based remote easy contract formation session that includes selecting a plurality of GUI icons on the electronic display of the first computing device 102*a* and inputting contract formation data into each of the plurality of digital data input fields as part of the "easy" contract formation session. Based on the needs and preferences of the user 104*a*, the type of contract formation session, i.e., the "easy" or "do-it-yourself" sessions, may be selectively modified by the user 104*a*. Said differently, the user 104*a* may switch from the "easy" contract formation session to the "do-it-yourself" contract formation session, and vice versa, as needed or desired. This feature is particularly beneficial where the needs or expertise of the user 104*a* vary from real estate transaction to real estate transaction, e.g., the user 104*a* may be very familiar with the sale of residential dwellings and therefore desire the "do-it-yourself" contract formation session but may be largely inexperienced or unfamiliar with the sale of commercial buildings and therefore stand to benefit more from the "easy" contract formation session in that circumstance.

Figure 47A:
FIGS. 47-48 are screen shot views of the plurality of digital data input fields for selling a home, in accordance with the present invention.
Figure 47B:
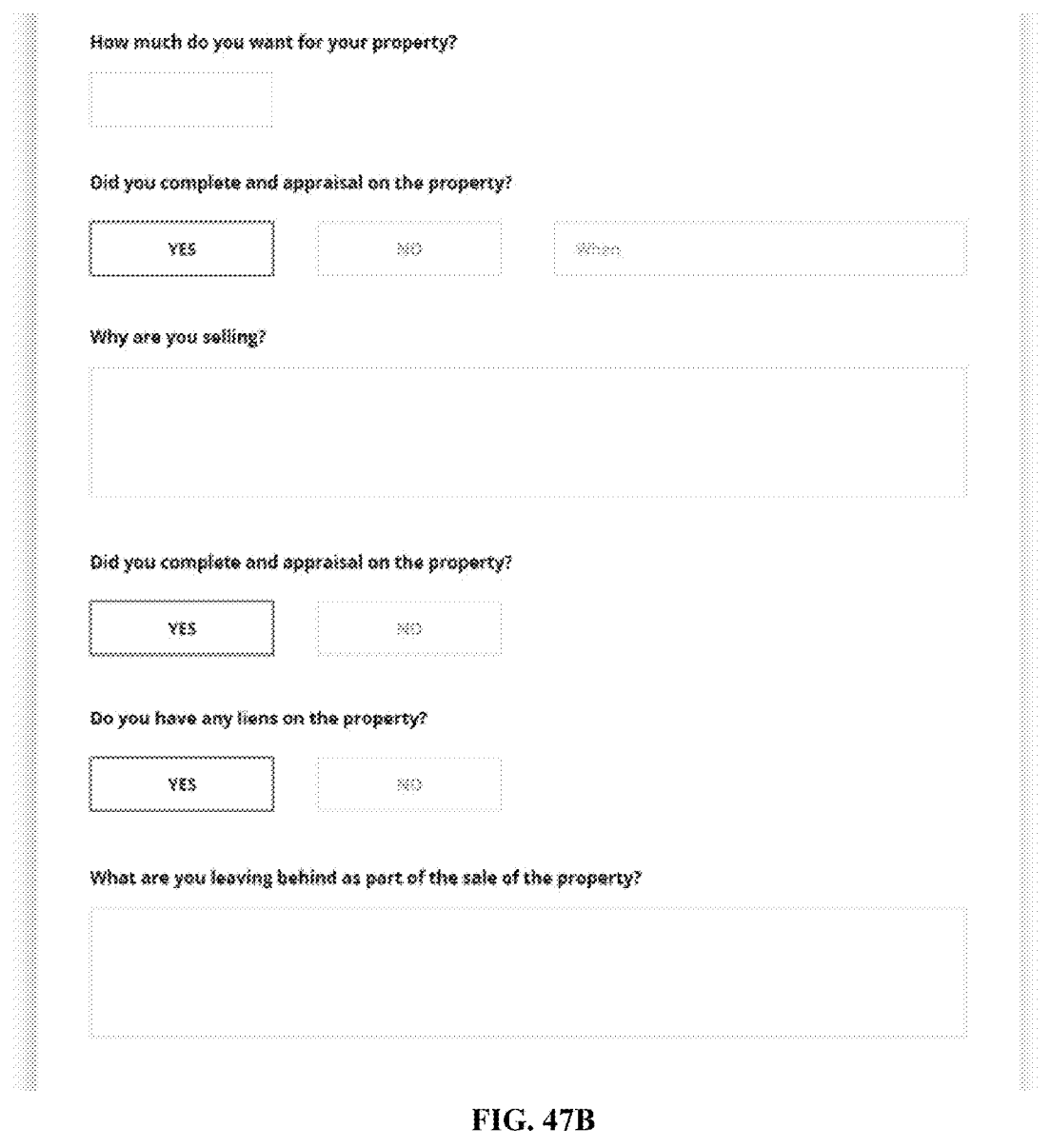
Figure 47C:
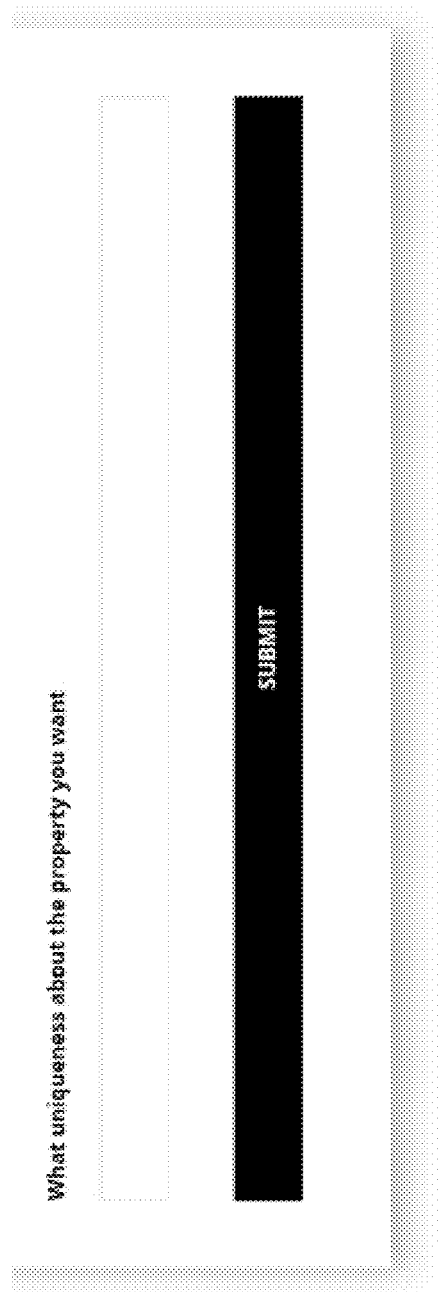
Figure 48:
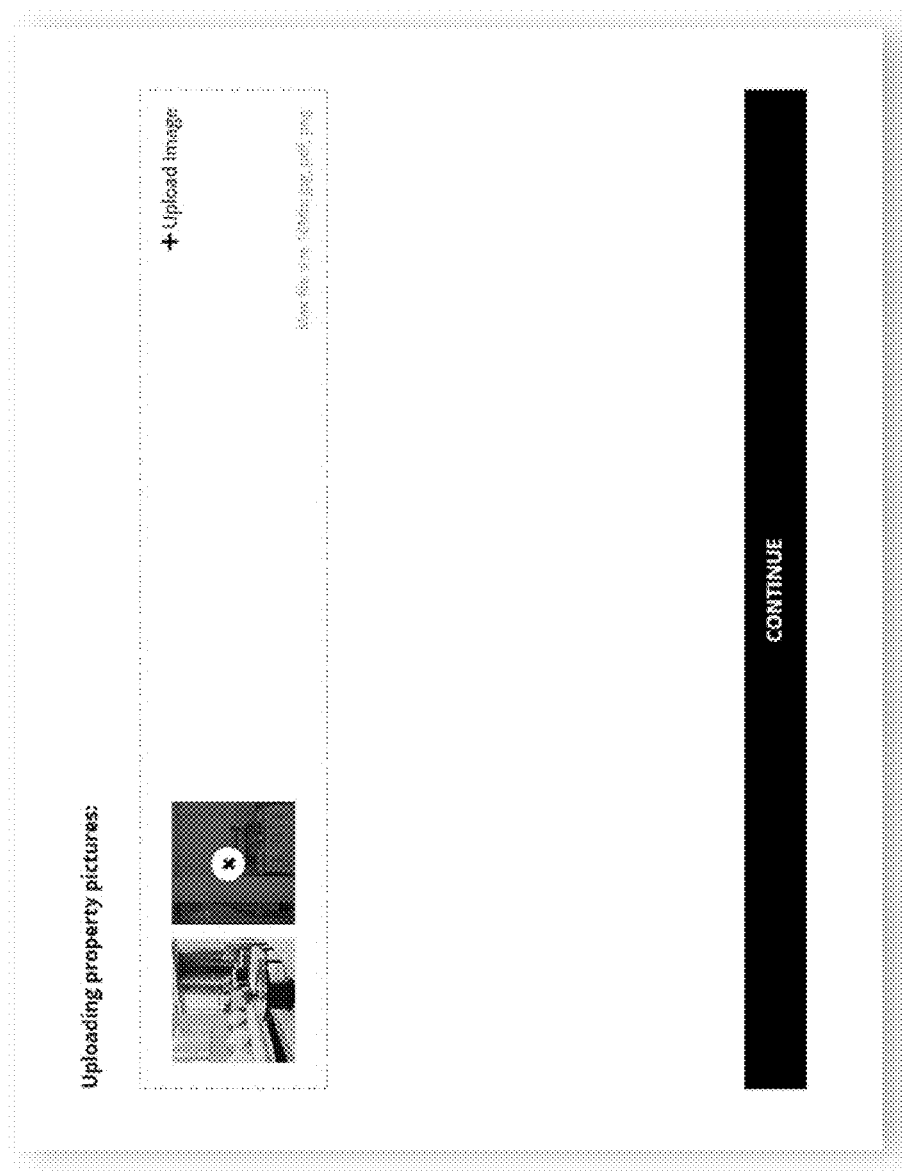
Figure 50:
Figure 52:
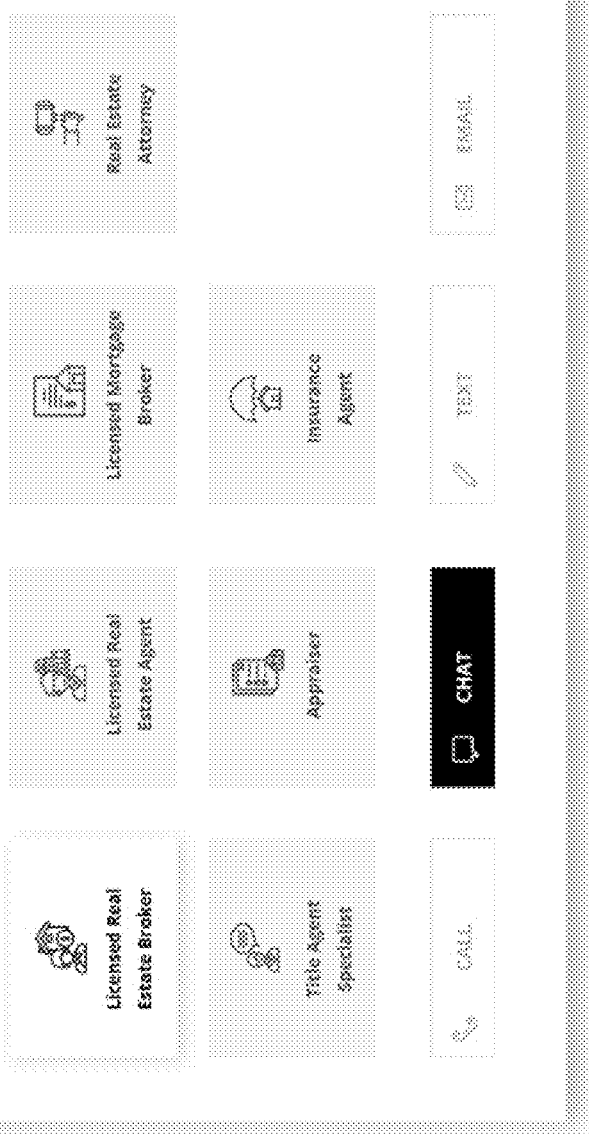
FIG. 52 is a screen shot view of a consultation request page, in accordance with the present invention.
Figure 53A:
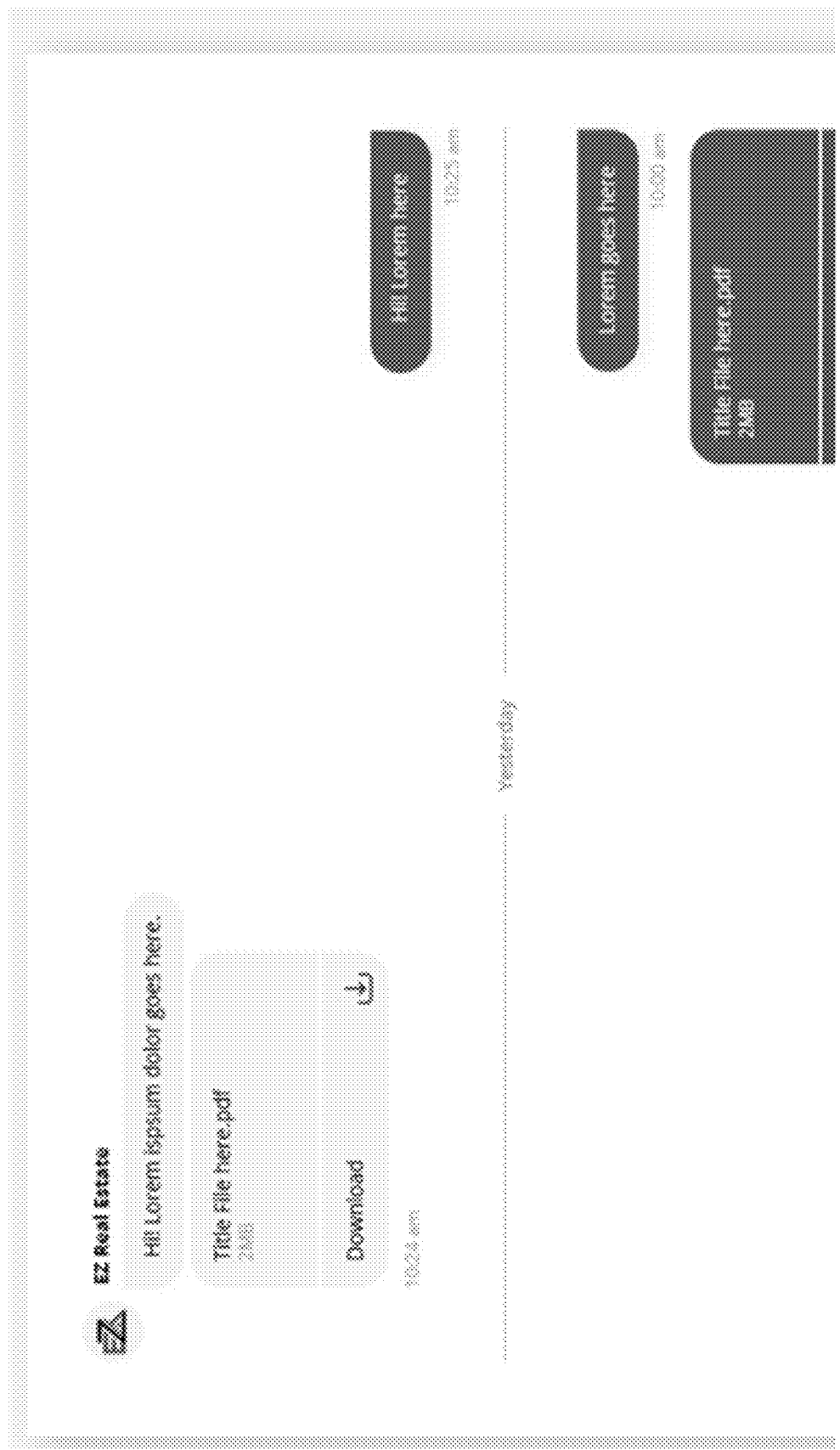
FIG. 53 is a screen shot view of a direct message chat between a user and a real estate professional, in accordance with the present invention.
Figure 53:
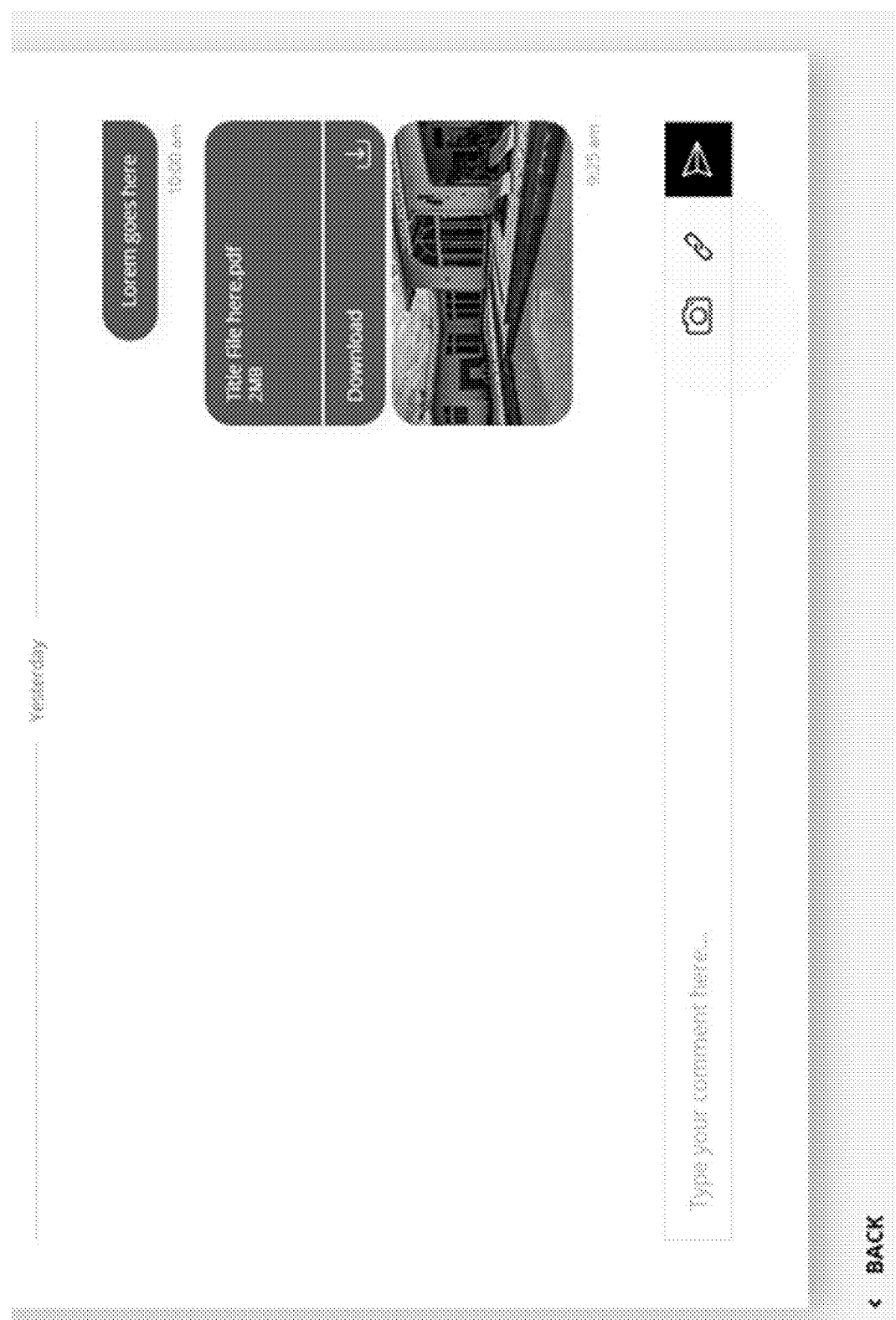
Figure 54A:
FIG. 54 is a screen shot view of a property listing page, in accordance with the present invention.
Figure 54B:
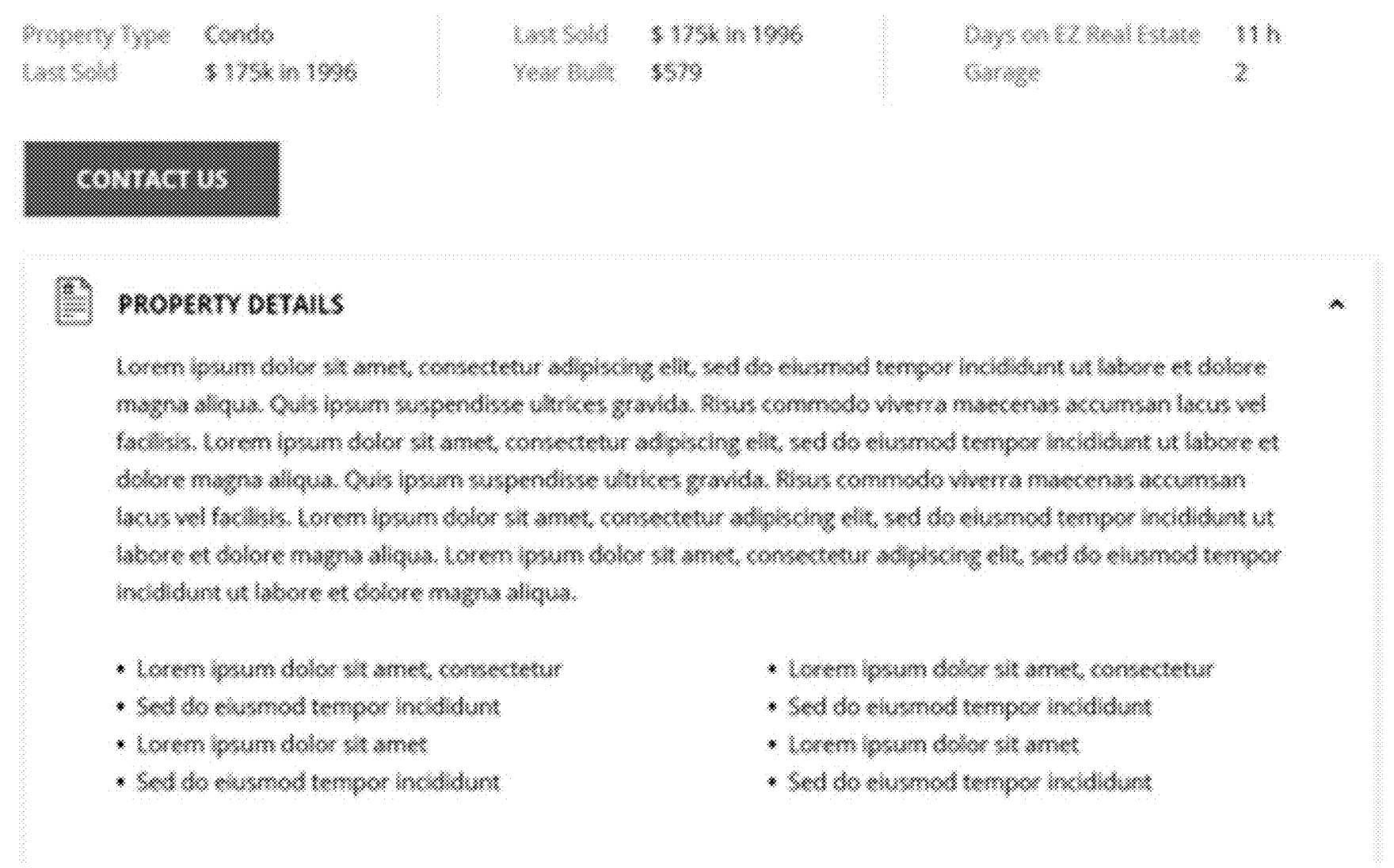
Figure 54C:
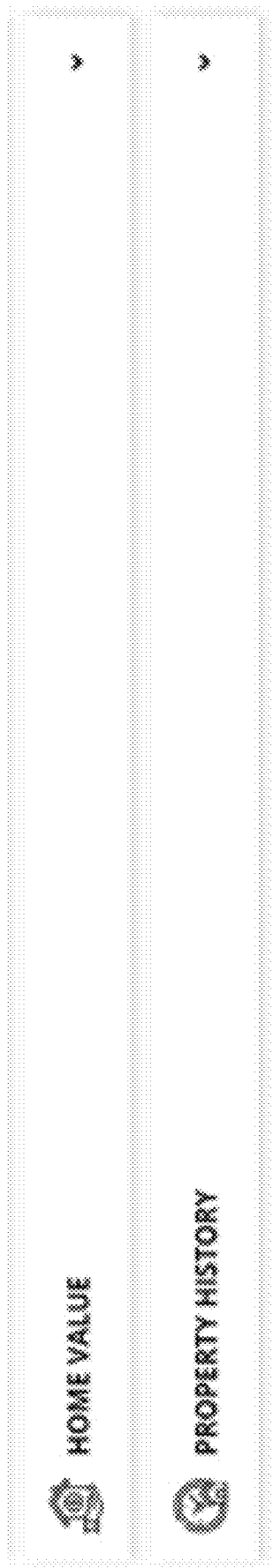

As demonstrated in FIGS. 47-54, the process 300 may also allow the user 104*a* to perform additional actions associated with or related to real estate, e.g., listing a property for sale (as depicted in FIGS. 47-48), requesting a professional list of properties available for purchase that fit the user's inputted criteria (as seen in FIGS. 49-51), submitting a request for a consultation with a real estate professional such as a licensed real estate broker, a licensed real estate agent, a licensed mortgage broker, a real estate attorney, a title agent specialist, an appraiser, or an insurance agent (as seen in FIG. 52), communicating with a real estate professional over the network 106 (as depicted in FIG. 53), and publishing, browsing, and reviewing property listings (as seen in FIG. 54).

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A computer-implemented and interactive real estate contract generation and editing process comprising the steps of:

providing a first electronic computing device of a first user and a computer server;

communicatively coupling the first electronic computing device of the first user to the computer server over a wireless communication network and generating a digital graphical user interface (GUI) on an electronic display of the first computing device with a plurality of digital data input fields operably configured to receive alpha-numeric text, each identified by an assigned array index on an array data structure, and with a plurality of GUI icons digital informational icon disposed proximal to each of the plurality of digital data input fields and having informational text included therein, the digital informational icon displaying the informational text on the electronic display of the first computing device upon selectively modulating the digital informational icon;

initiating a network-based remote easy contract formation session that includes generating a plurality of GUI icons each relating to a type of real estate transaction the user is seeking to prepare and generating, after selection of one of the plurality of GUI icons, a plurality of independent and sequentially viewable windows and selecting, within the plurality of independent and sequentially viewable windows, another plurality of GUI icons on the electronic display of the first computing device and inputting contract formation data into each of the plurality of digital data input fields; and generating, after completion of the plurality of independent and sequentially viewable windows and at a conclusion of the network-based remote easy contract formation session, a digital document in the network-based remote easy contract formation session with a plurality of independent preformed paragraphs each having at least one fillable contract data field disposed therein and assigned to, using an array data structure with the assigned array index, and filled in with contract formation data to one of the plurality of digital data input fields within the plurality of independent and sequentially viewable windows to create a finalized digital document without any fillable contract data field therein and that is downloadable to the electronic display of the first computing device.

2. The computer-implemented process according to claim 1, wherein:

the first electronic computing device of the first user is geographically located at a different physical building location than the computer server.

3. The computer-implemented process according to claim 1, further comprising:

communicatively coupling the first electronic computing device of the first user to the computer server over the wireless communication network and registering into a user account resident on the computer server before generating the digital GUI on the electronic display of the first computing device.

4. The computer-implemented process according to claim 1, further comprising:

generating the finalized digital document without fillable contract data field therein and that is transferrable from the electronic display of the first computing device to a second computing device of a second user over the wireless communication network.

5. The computer-implemented process according to claim 1, further comprising:

initiating, when selectively modified by the user, a network-based remote do-it-yourself contract formation session that includes generating a digital document with a plurality of GUI icons on the electronic display of the first computing device, with a plurality of independent preformed paragraphs each having at least one digital data input field therein, and filling in the at least one digital data input field to create a finalized digital document without any fillable contract data field therein and that is downloadable to the electronic display of the first computing device.

6. The computer-implemented process according to claim 5, further comprising:
a plurality of independent and sequentially viewable windows within the network-based remote do-it-yourself contract formation session that collectively form part of the digital document with the plurality of GUI icons on the electronic display of the first computing device.

7. The computer-implemented process according to claim 6, further comprising:
selectively choosing on the first electronic computing device of a first user one of either the easy contract formation session or the do-it-yourself contract formation session.

8. A computer-implemented and interactive real estate contract generation and editing process comprising the steps of:
providing a first electronic computing device of a first user and a computer server;
communicatively coupling the first electronic computing device of the first user to the computer server over a wireless communication network and generating a digital graphical user interface (GUI) on an electronic display of the first computing device with a plurality of digital data input fields operably configured to receive alpha-numeric text and with a digital informational icon disposed proximal to each of the plurality of digital data input fields and having informational text included therein, the digital informational icon displaying the informational text on the electronic display of the first computing device upon selectively modulating the digital informational icon;
initiating a network-based remote easy contract formation session that includes generating a plurality of GUI icons each relating to a type of real estate transaction the user is seeking to prepare and inputting contract formation data into each of the plurality of digital data input fields in a plurality of independent and sequentially viewable windows, after selection of one of the plurality of GUI icons, that collectively form part of selecting another plurality of GUI icons on the electronic display of the first computing device and the inputting contract formation data into each of the plurality of digital data input fields, the plurality of independent and sequentially viewable windows generating before generation of the digital document in the network-based remote easy contract formation session with the plurality of independent preformed paragraphs; and
generating, after completion of the plurality of independent and sequentially viewable windows, a digital document in the network-based remote easy contract formation session with a plurality of independent preformed paragraphs each having at least one fillable contract data input field disposed therein and assigned to, using an array data structure, and filled in with contract formation data to one of the plurality of digital data input fields within the plurality of independent and sequentially viewable windows to create a finalized digital document without any fillable contract data field therein.

9. The computer-implemented process according to claim 8, further comprising:
initiating, when selectively modified by the user, a network-based remote do-it-yourself contract formation session that includes generating a digital document with a plurality of GUI icons on the electronic display of the first computing device, with a plurality of independent preformed paragraphs each having at least one digital data input field therein, and filling in the at least one digital data input field to create a finalized digital document without any fillable contract data field therein and that is downloadable to the electronic display of the first computing device.

10. The computer-implemented process according to claim 8, further comprising:
selectively choosing on the first electronic computing device of a first user one of either the easy contract formation session or the do-it-yourself contract formation session.

* * * * *